United States Patent
Reinfelder et al.

(10) Patent No.: US 6,275,871 B1
(45) Date of Patent: Aug. 14, 2001

(54) ASYNCHRONOUS TRANSPORT OPTIMIZING OBSERVER-PATTERN-LIKE SYSTEM SUPPORTING SEVERAL MODES FOR AN INTERFACE DEFINITION LANGUAGE-LESS COMMUNICATION SUBSYSTEM

(75) Inventors: Hans-Erich Reinfelder, Erlangen; Karlheinz Dorn, Kalchreuth; Dietrich Quehl, Erlangen; Detlef Becker, Moehrendorf, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/676,859

(22) Filed: Jul. 3, 1996

(51) Int. Cl.[7] ........................................ G06F 9/00

(52) U.S. Cl. ...................... 709/328; 709/318; 709/315

(58) Field of Search ..................... 395/680, 682, 395/683, 200.31–200.39, 200.47–200.49; 709/328, 318, 310, 315, 201, 217, 245

(56) References Cited

U.S. PATENT DOCUMENTS

| | | |
|---|---|---|
| 4,853,843 | 8/1989 | Ecklund . |
| 5,019,963 | 5/1991 | Alderson et al. . |
| 5,043,871 | 8/1991 | Nishigaki et al. . |
| 5,047,918 | 9/1991 | Schwartz et al. . |
| 5,129,082 | 7/1992 | Tirfing et al. . |
| 5,151,987 | 9/1992 | Abraham et al. . |
| 5,161,223 | 11/1992 | Abraham . |
| 5,161,225 | 11/1992 | Abraham et al. . |
| 5,212,792 * | 5/1993 | Gerety et al. ..................... 395/650 |
| 5,257,369 * | 10/1993 | Skeen et al. ..................... 395/650 |
| 5,265,206 | 11/1993 | Shackelford et al. . |
| 5,307,490 * | 4/1994 | Davidson et al. ................. 395/650 |
| 5,313,629 | 5/1994 | Abraham et al. . |
| 5,339,421 * | 8/1994 | Housel, III ..................... 395/700 |
| 5,367,633 | 11/1994 | Matheny et al. . |
| 5,428,722 * | 6/1995 | Marsh et al. ..................... 395/133 |
| 5,437,027 | 7/1995 | Bannon et al. . |
| 5,481,706 * | 1/1996 | Peek .............................. 395/650 |
| 5,499,365 | 3/1996 | Anderson et al. . |
| 5,790,789 * | 8/1998 | Suarez ........................ 395/200.32 |

OTHER PUBLICATIONS

The Ojbeck Management Group, Common Object Services Specification, vol. 1, John Wiley & Sons, Inc., pp. 31–64, Mar. 1, 1994.*

OMG, The Common Object Request Broker:Architecture and Specification Revision 1.2,, pp. 36, 39, Dec. 29, 1993.*

W. R. Stevens, Unix Network Programming, Prentice Hall, Inc., pp. 692–708, 1990.*

S. Rago, "XDR: Moving Data Between Platforms (External Data Representation)", Unix Review, vol. 12, No. 6, p55(6), Jun. 1994.*

D. C. Schmidt, "The Adaptive Communication Environment An Object Oriented Network Programming Toolkit for Developing Communication Software", the 11th and 12th Sun User Group Conferences, pp. 1–24, Dec. 7, 1993.*

(List continued on next page.)

*Primary Examiner*—Majid Banankhah
*Assistant Examiner*—Sue Lao
(74) *Attorney, Agent, or Firm*—Schiff Hardin & Waite

(57) ABSTRACT

An object oriented communication system supporting external data representation without an interface definition language, propagating events in both push and pull communication modes, fully distributing events, client/server-RPC-like mode and server processing pattern management. An applications program interface for the communication system having two macro routines for building classes which make the classes transferrable by the communication system.

38 Claims, 16 Drawing Sheets

OTHER PUBLICATIONS

A. Gokhale, et al., The Performance of the CORBA Dynamic Invocation Interface and Dynamic Skeleton Interface Over High–Speed ATM Networks Nov. 1996.

D. Schmidt, et al., Experiences With an Object–Oriented Architecture for Developing Dynamically Extensible Distributed System Management Software, Nov. 1994.

D. Schmidt, et al., Object–Oriented Components for High-–speed Netowrk Programming, no date.

I. Pyardi, et al., Design and Performance of an Object–Oriented Framework for High–Speed Electronic Medical Imaging Jun., 1996.

D. Heich, Generic Cmputer Aided Software Engineering (CASE) Databases Requirements, IEEE 1989, pp. 422–423.

D.H. Fishman, An Overview of the IRIS Object–Oriented DBMS, COMPCOM Spring 1988, Thirty–Third IEEEComputer Society Internatoinal Conference, Feb. 29–Mar. 3, San Francisco, CA, pp. 177–180.

E. J. Dijkstra, The Structure of "THE" Multi programming System, Communications of the ACM, vol. 11, No. 5, May 1968, pp. 341–346.

C.A.R. Hoare, Monitors: Operating Systems Structuring Concepts, Communications of the ACM, vol. 17, No. 10, Oct., 1974, pp. 549–557.

Beech, et al., Generalized Versoin Control in an Object–Oriented Database, Proceedings Fourth International Conference on Data Engineering, Feb. 1–5, 1988, Los Angeles, CA, pp. 14–22.

Chou, et al., Versons and Change Notification in an Object–Oriented database System, 25th ACM/IEEE Design Automation Conference, Jun. 12–15, 1988, Anaheim, CA, pp. 275–281.

* cited by examiner

*FIG. 4*
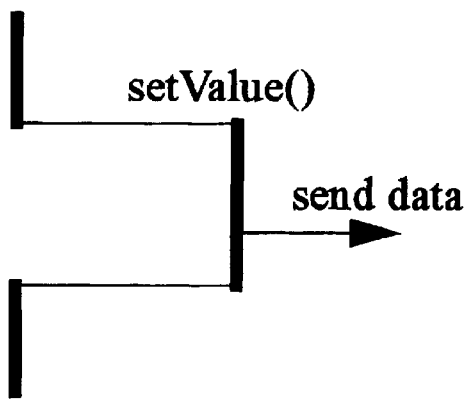
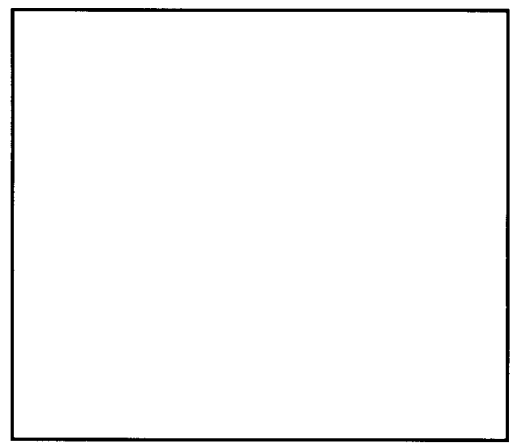
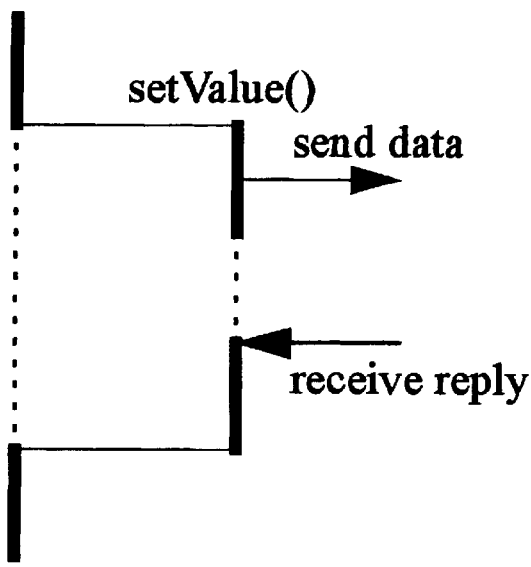
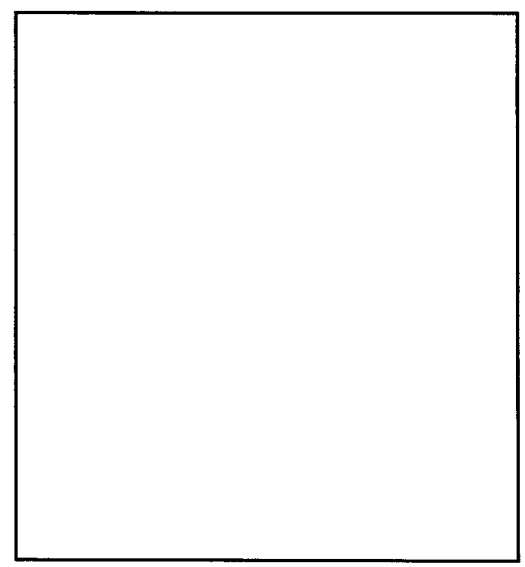
*FIG. 5*

*FIG. 6*
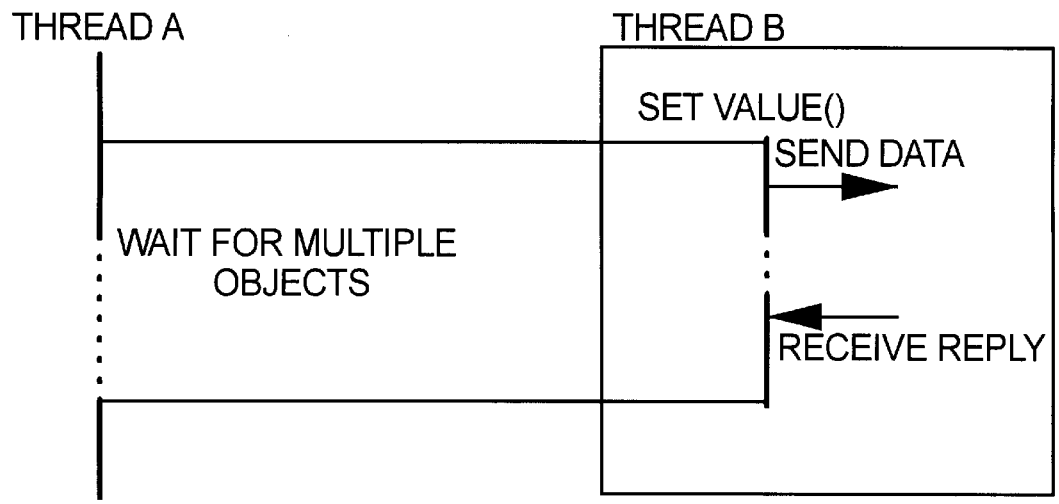
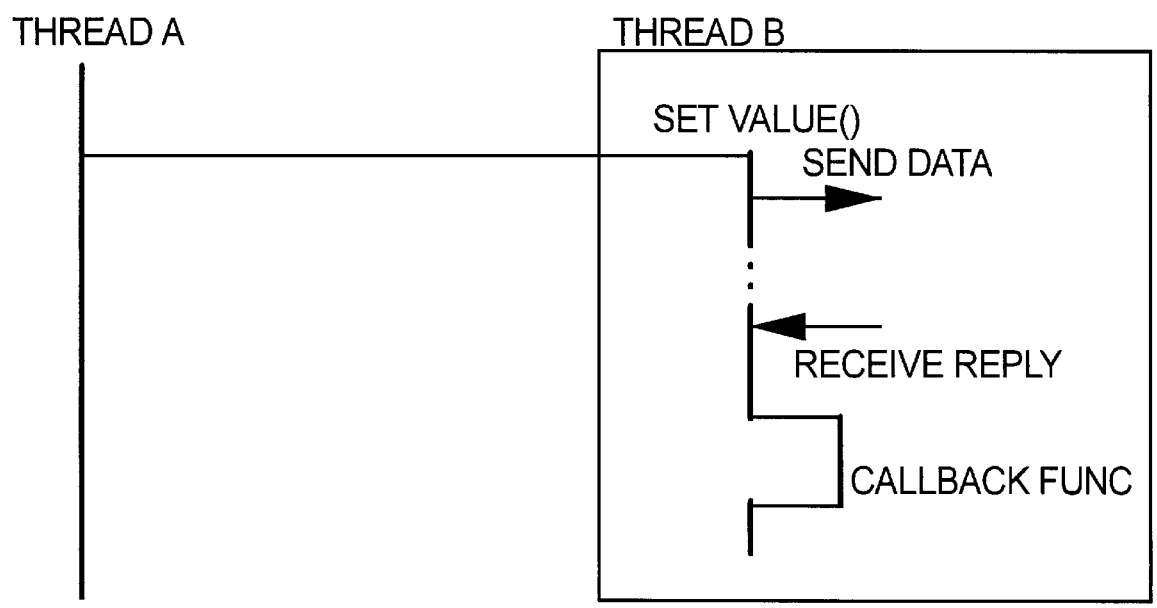
*FIG. 7*

FIG. 12
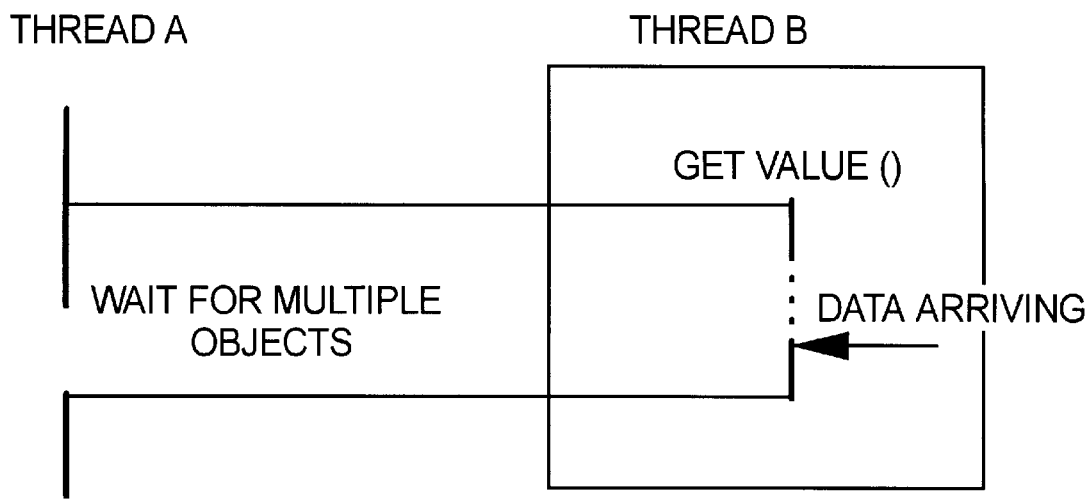
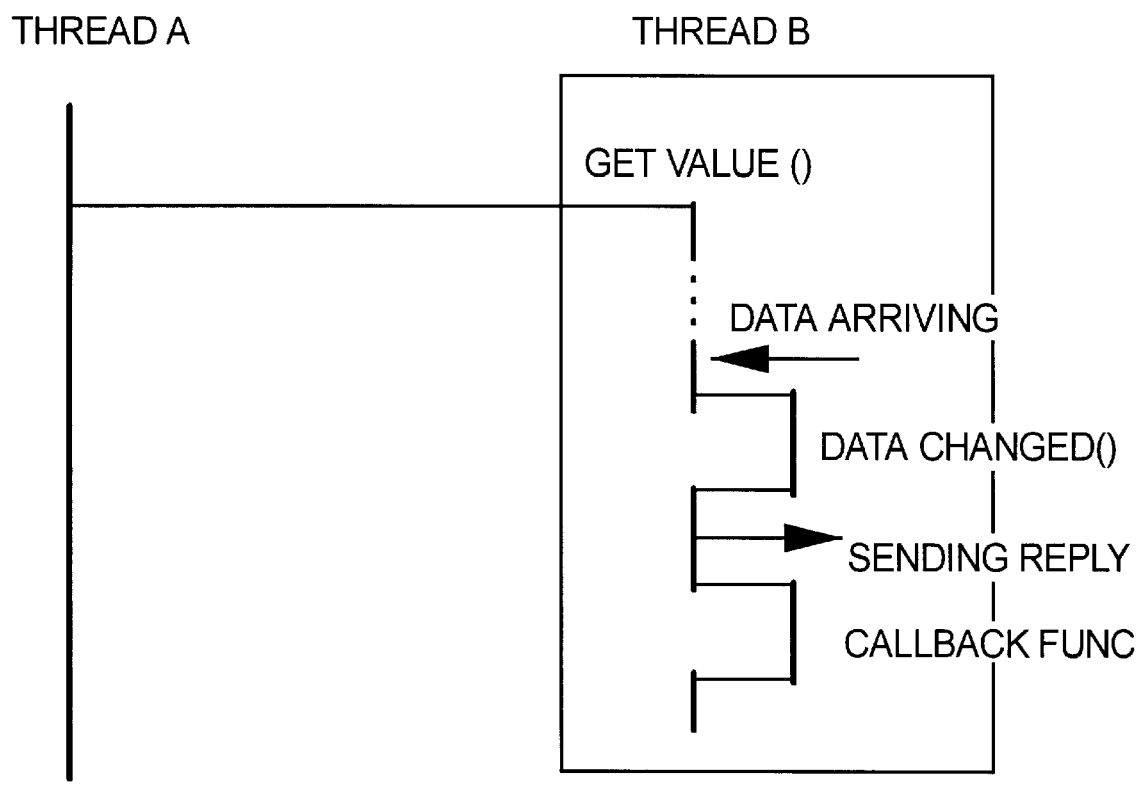
FIG. 13

ASYNCHRONOUS TRANSPORT OPTIMIZING OBSERVER-PATTERN-LIKE SYSTEM SUPPORTING SEVERAL MODES FOR AN INTERFACE DEFINITION LANGUAGE-LESS COMMUNICATION SUBSYSTEM

BACKGROUND OF THE INVENTION

The present application is directed to application programmers interfaces (API) for programmer applications for communications systems.

As set forth in U.S. Pat. No. 5,499,365, full incorporated herein by reference, object oriented programming systems and processes, also referred to as "object oriented computing environments," have been the subject of much investigation and interest. As is well known to those having skill in the art, object oriented programming systems are composed of a large number of "objects." An object is a data structure, also referred to as a "frame," and a set of operations or functions, also referred to as "methods," that can access that data structure. The frame may have "slots," each of which contains an "attribute" of the data in the slot. The attribute may be a primitive (such as an integer or string) or an object reference which is a pointer to another object. Objects having identical data structures and common behavior can be grouped together into, and collectively identified as a "class."

Each defined class of objects will usually be manifested in a number of "instances". Each instance contains the particular data structure for a particular example of the object. In an object oriented computing environment, the data is processed by requesting an object to perform one of its methods by sending the object a "message". The receiving object responds to the message by choosing the method that implements the message name, executing this method on the named instance, and returning control to the calling high level routine along with the results of the method. The relationships between classes, objects and instances traditionally have been established during "build time" or generation of the object oriented computing environment, i.e., prior to "run time" or execution of the object oriented computing environment.

In addition to the relationships between classes, objects and instances identified above, inheritance relationships also exist between two or more classes such that a first class may be considered a "parent" of a second class and the second class may be considered a "child" of the first class. In other words, the first class is an ancestor of the second class and the second class is a descendant of the first class, such that the second class (i.e., the descendant) is said to inherit from the first class (i.e., the ancestor). The data structure of the child class includes all of the attributes of the parent class.

Object oriented systems have heretofore recognized "versions" of objects. A version of an object is the same data as the object at a different point in time. For example, an object which relates to a "work in progress", is a separate version of the same object data which relates to a completed and approved work. Many applications also require historical records of data as it existed at various points in time. Thus, different versions of an object are required.

Two articles providing further general background are E. W. Dijkstra, *The Structure of "THE" Multi programming System*, Communications of the ACM, Vol. 11, No. 5, May 1968, pp. 341–346, and C. A. R. Hoare, *Monitors: Operating Systems Structuring Concepts*, Communications of the ACM, Vol. 17, No. 10, October, 1974, pp. 549–557, both of which are incorporated herein by reference. The earlier article describes methods for synchronizing using primitives and explains the use of semaphores while the latter article develops Brinch-Hansen's concept of a monitor as a method of structuring an operating system. In particular, the Hoare article introduces a form of synchronization for processes and describes a possible method of implementation in terms of semaphores and gives a proof rule as well as illustrative examples.

As set forth in the Hoare article, a primary aim of an operating system is to share a computer installation among many programs making unpredictable demands upon its resources. A primary task of the designer is, therefore, to design a resource allocation with scheduling algorithms for resources of various kinds (for example, main store, drum store, magnetic tape handlers, consoles). In order to simplify this task, the programmer tries to construct separate schedulers for each class of resources. Each scheduler then consists of a certain amount of local administrative data, together with some procedures and functions which are called by programs wishing to acquire and release resources. Such a collection of associated data and procedures is known as a monitor.

The adaptive communication environment (ACE) is an object-oriented type of network programming system developed by Douglas C. Schmidt, an Assistant Professor with the Department of Computer Science, School of Engineering and Applied Science, Washington University. ACE encapsulates user level units and WIN32 (Windows NT and Windows 95) OS mechanisms via type-secured, efficient and object-oriented interfaces:

- IPC mechanisms—Internet-domain and UNIX-domain sockets, TLI, Named pipes (for UNIX and Win 32) and STREAM pipes;
- Event multiplexing—via select( ) and poll( ) on UNIX and WaitForMultipleObjects on Win 32;
- Solaris threads, POSIX Pthreads, and Win 32 threads;
- Explicit dynamic linking facilities—e.g., dlopen/dlsym/dlclose on UNIX and LoadLibrary/GetProc on Win 32;
- Memory-mapped files;
- System VIPC—shared memory, semaphores, message queues; and
- Sun RPC (GNU rpc++).

In addition, ACE contains a number of higher-level class categories and network programming frameworks to integrate and enhance the lower-level C++ wrappers. The higher-level components in ACE support the dynamic configuration of concurrent network daemons composed of application services. ACE is currently being used in a number of commercial products including ATM signaling software products, PBX monitoring applications, network management and general gateway communication for mobile communications systems and enterprise-wide distributed medical systems. A wealth of information and documentation regarding ACE is available on the worldwide web at the following universal resource locator:

http://www.cs.wustl.edu/. . . schmidt/ACE-overview.html.

The following abbreviations are or may be utilized in this application:

Thread—a parallel execution unit within a process. A monitor synchronizes, by forced sequentialization, the parallel access of several simultaneously running Threads, which all call up functions of one object that are protected through a monitor.

Synchronizations-Primitive—a means of the operating system for reciprocal justification of parallel activities.

Semaphore—a Synchronizations-Primitive for parallel activities.

Mutex—a special Synchronizations-Primitive for parallel activities, for mutual exclusion purposes, it includes a critical code range.

Condition Queue—an event waiting queue for parallel activities referring to a certain condition.

Gate Lock—a mutex of the monitor for each entry-function, for protection of an object, for allowing only one parallel activity at a time to use an Entry-Routine of the object.

Long Term Scheduling—longtime delay of one parallel activity within a condition queue or event waiting queue for parallel activities.

Broker—a distributor.

In addition, the following acronyms are or may be used herein:

AFM Asynchronous Function Manager
SESAM Service & Event Synchronous Asynchronous Manager
PAL Programmable Area Logic
API Application Programmers Interface
IDL Interface Definition Language
ATOMIC Asynchron Transport Optimizing observer-pattern-like system supporting several Modes (client/server—push/pull) for an IDL-less Communication subsystem, described herein
XDR External Data Representation
I/O Input/Output
IPC Inter Process Communication
CSA Common Software Architecture (a Siemens AG computing system convention)
SW Software

SUMMARY OF THE INVENTION

The present invention provides a location and protocol transparent object oriented communication system that implicitly encodes and decodes transferred data, if connected peers reside on hosts with different internal data representations. In that regard, the invention provides an Asynchronous Transport Optimizing Observer-Pattern-Like System Supporting Several Modes for an Interface Definition Language-less Communication Subsystem (ATOMIC) as well as an application programming interface therefor. However, the data structure must be identical to that expected by the supplier.

In an embodiment, the invention provides an object oriented communication system on a computer platform, comprising: means for supporting external data representation without an interface definition language; means for propagating events in both push and pull communication modes and selecting which mode is used for a given connection; means for distributing events; and means for server processing pattern management.

In an embodiment, the means for supporting external data representation without an interface definition language comprises means for implicitly coding and decoding transferred data.

In an embodiment, all communication end points that use the same address are logically connected.

In an embodiment, there is provided a hook routine which called at the supplier side before data is sent and a hook routine which is called before data is stored in a target object, both hook routines called with an environment string as an argument, both hook routines influencing data transfer.

In an embodiment, the invention further provides means for performing XDR encoding and decoding.

In an embodiment, the invention further provides a macro routine which makes a class accessible to a communication endpoint.

In an embodiment, the macro routine makes the class accessible via the communication end point by declaring inserter and extractor operators of the communication systems internal encoder/decoder class as friends, and implementing short member functions and one member function pointer into the class.

In an embodiment, the invention further provide a macro routine which defines a subset of data members that are to be transferred and informs the underlying system as to how to deal with pointers and vectors.

In an embodiment, the macro routine has two arguments, a class name and a list of white space separated macro routines, one such macro routine for each transferrable data member.

In an embodiment, the invention provides a supplier class associated with a pattern string in order to transfer component classes to consumers associated with the same pattern string residing on a host.

In an embodiment, the supplier class is a template class and can only exist in conjunction with a concrete component class.

In an embodiment, the invention further provides a consumer class associated with a pattern string in order to receive component classes in PUSH mode or PULL mode from suppliers associated with the same pattern string residing on hosts.

In an embodiment, the consumer class is a template class and can only exist in conjunction with a concrete component class.

In an embodiment, the invention provides an object oriented communication system on a computer platform, comprising: means for supporting external data representation without any interface definition language said means for supporting external data representation without an interface definition language comprises means for implicitly encoding and decoding transfer data; means for propagating events in both push and pull communication modes and selecting which mode is used for a given connection, including a hook routine called at the supplier side before data is sent and a hook routine called before data is stored in a target object, both hook routines called within an environment string as an argument; means for distributing events; and means for server processing pattern management, wherein all communication endpoints that use the same address are logically connected.

In an embodiment, the invention provides an object oriented communication system programmer interface on a computer platform, comprising: a first macro routine which makes a class accessible to a communication endpoint by declaring inserter and extractor operators of a communication systems internal encoder/decoder class as friends and implementing short member functions and one member function pointer into the class; and a second macro routine which defines a subset of data members that are to be transferred and informs the underlying system as to how to deal with pointers and vectors, a second macro routine having two arguments, a class name and a list of white space separated macro routines, one such white space separate macro routine for each transferrable data member.

In an embodiment, the invention provides a supplier class associated with a pattern string in order to transfer component classes to consumers associated with the same pattern string residing on a host.

In an embodiment, the supplier class is a template class and can only exist in conjunction with a concrete component class.

In an embodiment, the invention further provides a consumer class associated with a pattern string in order to receive component classes in PUSH mode or PULL mode from suppliers associated with the same pattern string residing on hosts.

In an embodiment, the consumer class is a template class and can only exist in conjunction with a concrete component class.

These and other features of the invention are discussed in greater detail below in the following detailed description of the presently preferred embodiments with reference to the accompanying drawings.

BRIEF DESCRIPTION OF THE DRAWINGS

FIG. 4 illustrates use of a setValue( ) using event propogation or client/server communication without reply.

FIG. 5 illustrates blocking of a setValue( ) using client/server communication with reply.

FIG. 6 illustrates a nonblocking setValue( ) using client/server communication with reply—waitFor . . . ( ).

FIG. 7 illustrates a nonblocking setValue( ) using client/server communication with reply—callback.

FIG. 12 illustrates a nonblocking getValue( ) using waitForMultipleObjects.

FIG. 13 illustrates a nonblocking getValue( ) using callback function.

COPENDING APPLICATIONS

The following commonly assigned copending applications are fully incorporated herein by reference:

| Title | Ser. No. | Filing Date | Docket No. |
|---|---|---|---|
| MONITOR SYSTEM FOR SYNCHRONIZATION OF THREADS WITHIN A SINGLE PROCESS | 08/675,346 | 7/3/96 | P96,0460 |
| SERVICE AND EVENT SYNCHRONOUS/ASYN-CHRONOUS MANAGER | 08/675,616 | 7/3/96 | P96,0461 |
| SOFTWARE ICS FOR HIGH LEVEL APPLICATION FRAMEWORKS | 08/675,846 | 7/3/96 | P96,0463 |

DETAILED DESCRIPTION OF THE PRESENTLY PREFERRED EMBODIMENTS

As stated above, the present invention (ATOMIC) provides a communication system application programmers interface (API) as well as basic mechanisms of the system itself.

Again referring to U.S. Pat. No. 5,499,365, in an object oriented computing environment, work is accomplished by sending action request messages to an object which contains data. The object will perform a requested action on the data according to its predefined methods. Objects may be grouped into object classes which define the types and meanings of the data, and the action requests (messages) that the object will honor. The individual objects containing data are called instances of the class.

Object classes can be defined to be subclasses of other classes. Subclasses inherit all of the data characteristics and methods of the parent class. They can add additional data and methods and they can override or redefine any data elements or methods of the parent class. An object may be represented schematically, and generally is represented herein by a rectangle. The upper rectangle contains the data structure represented by a frame having slots, each of which contains an attribute of the data in the slot. The lower rectangle indicates the object's methods which encapsulate the frame and which are used to perform actions on the data encapsulated in the frame of the upper rectangle.

Figure 1:
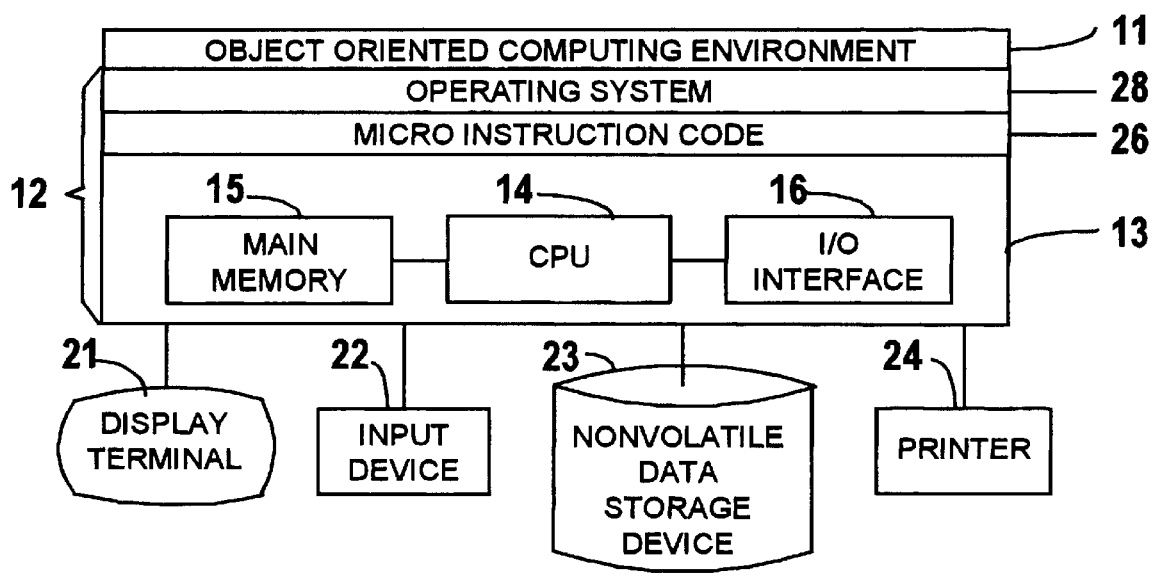
FIG. 1 illustrates a hardware and software environment.
Figure 2:
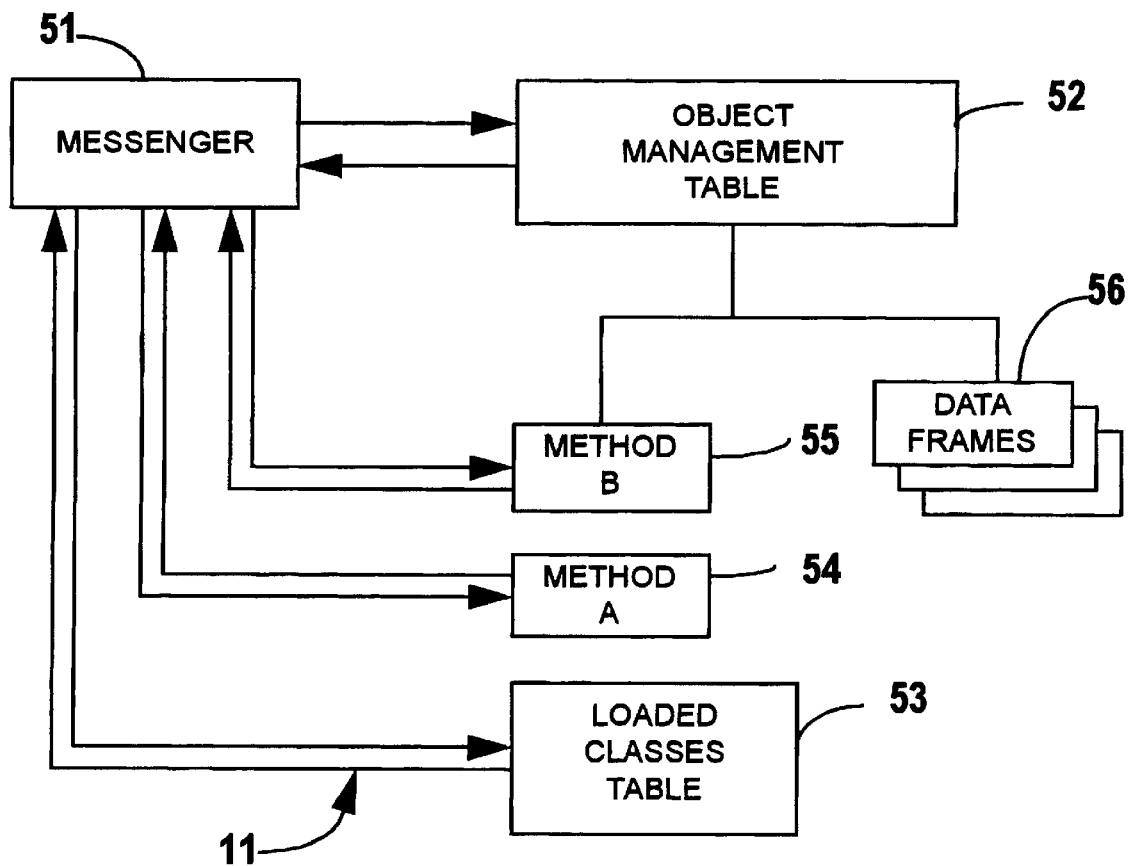
FIG. 2 illustrates the main components of an object-oriented program.
Figure 3:
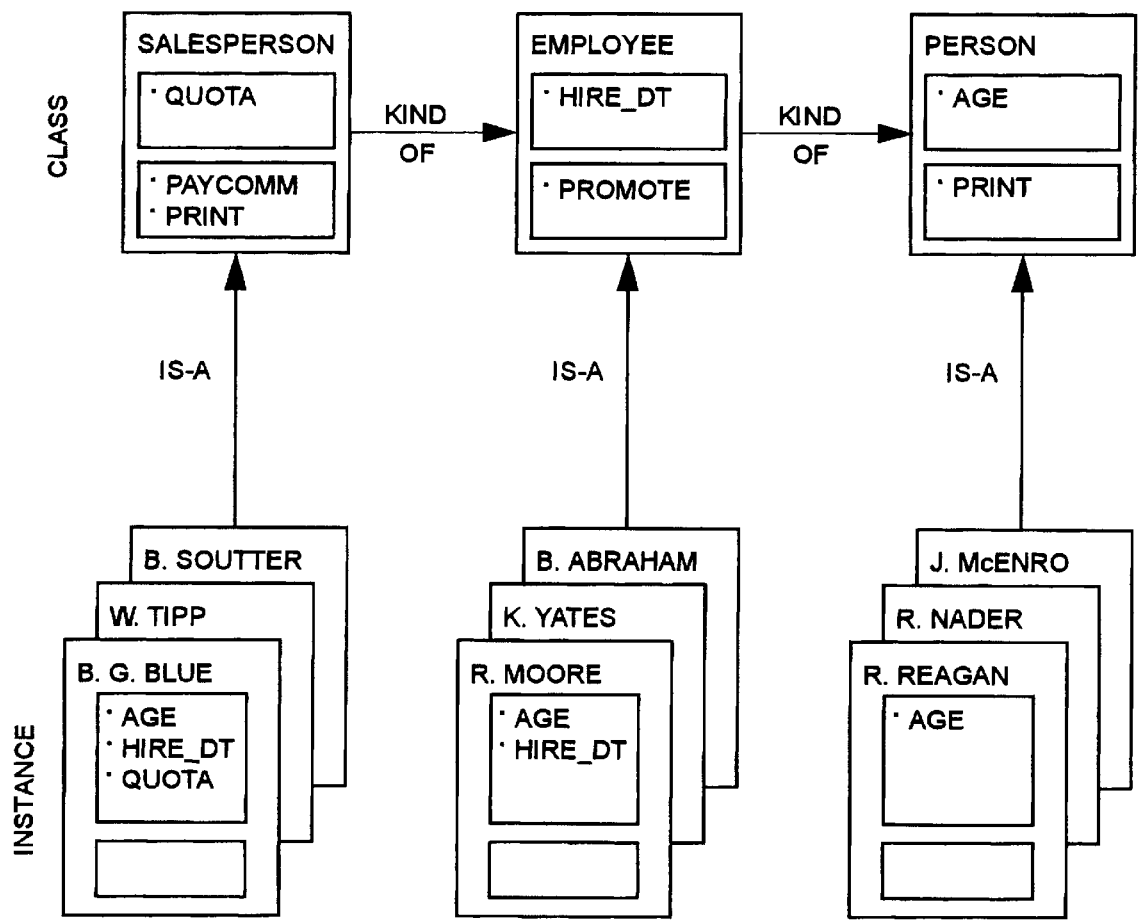
FIG. 3 illustrates an example of an inheritance hierarchy to an object oriented platform.

FIGS. 1, 2 and 3 are reproduced herein from U.S. Pat. No. 5,499,365. The following description relating thereto is derived from that patent.

Referring now to FIG. 1, a hardware and software environment in which the present invention operates will now be described. As shown in FIG. 1, the present invention is a method and system within an object oriented computing environment 11 operating on one or more computer platforms 12. It will be understood by those having skill in the art that computer platform 12 typically includes computer hardware units 13 such as a central processing unit (CPU) 14, a main memory 15 and an input/output (I/O) interface 16, and may include peripheral components such as a display terminal 21, an input device 22 such as a keyboard or a mouse, nonvolatile data storage devices 23 such as magnetic or optical disks, printers 24 and other peripheral devices. Computer platform 12 also typically includes microinstruction codes 26 and an operating system 128.

As shown in FIG. 1, object oriented computing environment 11 operates on computer platform 12. It will be understood by those having skill in the art that object oriented computing environment may operate across multiple computer platforms. Object oriented computing environment 11 is preferably written in the C++ computer programming language. The design and operation of computer platforms and object oriented computing environments including that of an object manager, are well known to those having skill in the art and are described, for example, in U.S. Pat. No. 5,265,206 issued Nov. 23, 1993 to Abraham, et al., entitled "A Messenger and Object Manager to Implement an Object Oriented Environment"; and U.S. Pat. No. 5,161,225 to Abraham, et al., entitled "Persistent Stream for Processing Time Consuming and Reusable Queries in an Object Oriented Database Management System; U.S. Pat. No. 5,151, 987 to Abraham, et al., entitled "Recovery Objects in an Object Oriented Computing Environment"; and U.S. Pat. No. 5,161,223 to Abraham, entitled "Resumeable Batch Query for Processing Time Consuming Queries in an Object Oriented Database Management System", the disclosures of which are hereby incorporated herein by reference, and in numerous textbooks such as Object Oriented Software Construction by Bertrand Meyer, published by Prentice Hall in 1988, the disclosure of which is incorporated herein by reference and the publication referred to above in the Background section..

Referring now to FIG. 2, the main components of an object oriented program (11, FIG. 1) will be described. A detailed description of the design and operation of an object oriented program is provided in "Object Oriented Software Construction", by Bertrand Meyer, published by Prentice Hall in 1988, the disclosure of which is incorporated herein by reference.

Referring to FIG. 2, a typical object oriented computing environment 11 includes three primary components: a Messenger 51, and Object Management Table 52 and a Loaded Classes Table 53. The Messenger 51 controls communication between calling and called messages, Object Management Table 52 and Loaded Classes Table 53. Object Management Table 52 contains a list of pointers to all active object instances. The Loaded Classes Table 53 contains a list of pointers to all methods of active object classes.

Operation of the Object Oriented Program 11 will now be described for the example illustrated in FIG. 2, in which Methods A (block 54) of an object sends a message to method B (block 55) of an object. Method A sends a message to Method B by calling Messenger 51. The message contains (1) an object reference of the instance to receive the message, (2) the method the object instance is requested to perform on the data it encapsulates, and (3) any parameters needed by the receiving method. Messenger 51 obtains a pointer to the data frame 56 of the instance object specified by Method A, by searching Object Management Table 52 for the instance object. If the specified instance object cannot be found, Object Management Table 52 adds the instance object to the table and calls the instance to materialize its data from the database. Once in the instance table, Object Management Table 52 returns the pointer to the materialized instance object.

Messenger 51 then obtains the address of Method B from the Loaded Classes Table 53. If the instance's class is not loaded, the Loaded Classes Table 53 will load it at this time to materialize its data. The Loaded Classes Table 53 searches for the specified method (Method B) and returns the address of the method to Messenger 51.

The Messenger 51 then calls Method B, passing it a system data area and the parameters from the call made by Method A including the pointer. Method B accesses the data frame 56 using the pointer. Method B then returns control to the Messenger 51 which returns control to Method A.

FIG. 3 illustrates an example of an inheritance hierarchy to an object oriented computing platform. As shown, three object classes are illustrated for "salesperson", "employee" and "person", where a salesperson is a "kind of" employee, which is a "kind of" person. In other words, salesperson is a subclass of employee and employee is the superclass of salesperson. Similarly, employee is the subclass of person and person is the superclass of employee. Each class shown includes three instances. B. Soutter, W. Tipp and B. G. Blue are salespersons. B. Abraham, K. Yates and R. Moore are employees. J. McEnroe, R. Nader and R. Reagan are persons. In other words, an instance is related to its class by an "is a" relation.

Each subclass "inherits" the frames and methods of its superclass. Thus, for example, a salesperson frame inherits age and hire date objects from the employee's superclass as well as promote methods from the employee superclass. Salesperson also includes a unique quota attribute and a pay commission method. Each instance can access all methods and frames of its superclass, so that, for example, B. G Blue can be promoted.

The ATOMIC communication system is a location and protocol transparent object oriented communication system that implicitly encodes and decodes transferred data, if the connected peers reside on hosts with different internal data representation.

To that end, all communication endpoints (a/k/a peers) that use the same address—a character string (pattern)—are logically connected. The patterns are valid with the network segment the host is connected to. Different name spaces may be realized by using a name service for the pattern strings (e.g., by adding the host name and/or the process name to the pattern string).

The communication system provides one way communication between supplier and consumer peers.

COMMUNICATION MODES

The ATOMIC communication system supports two communication modes: an event propogation mode, which is preferred; and a classic client/server communication mode, which is known from RPC based communication toolkits.

Table 1 below summarizes a comparison of the event propagation and classic client/server communication modes:

TABLE 1

| Event Propogation and Client/Server Modes | |
|---|---|
| Event Propagation Modes<br>m (suppliers) to n (consumers)<br>Connections | PUSH Mode  Consumer<br>Callback<br>PULL Mode  Supplier Selection<br>Single Push without reply |
| Client/Server Communication Modes<br>n (suppliers) to 1 (consumer) | Supplier with Callback and/or<br>waitFor . . . ()<br>( . . . [REPLY [,Callback]<br>[,SynchHandle]]) |

TABLE 1-continued

Event Propogation and Client/Server Modes

| Connections | Consumer with Callback and/or waitFor . . . () ( . . . [WAIT [,Callback] [,SynchHandle]]) |
|---|---|

Event Propogation Mode

In the event propagation mode one or more suppliers make events known to zero (0) or more consumers, which may be interested in this event by using the same pattern string as the supplier(s). Neither acknowledgments nor replies are supported in this mode because of the arbitrary number of consumers. This mode supports two transfer modes described next, the PUSH mode and the PULL mode.

The PUSH Mode

The PUSH mode—the most common event propagation mode—is a supplier triggered communication. The supplier of an event propagates an event that causes the delivery of a dataChanged( ) method (which is a callback function, action routine)—if enabled by the consumer—in the consumer context. It is up to the consumers whether to allow PUSH mode events to be queued (such that no event is lost) or not to be queued.

The Pull Mode

The PULL mode is a consumer triggered communication. The consumer fetches incoming events independently of the supplier's timing in propagating them. There is no queuing at the consumer's side because every consumer read request causes the communication system to get a copy of the latest version of the supplier's data. The internal handling depends on the queuing flag set (or not set) in the consumer's CsaRemote object. In case of queuing, a "getValue( )" call blocks until the next data structure is provided by the supplier, if queuing is switched off, the "getValue( )" call returns the contents of the last data structure that were sent by the selected supplier (if any, otherwise an error is reported).

To avoid multiple queries into the same receiver object as the result of a consumer read request, one supplier must be selected to get a unique object read.

Client/Server Communication Mode

The classic supplier triggered client/sever communication allows one or more clients (suppliers) to connect to one (and only one) server (consumer). This n-to-one relationship allows the server to send a reply back to the client on an incoming event (message), if this reply was requested by the client (supplier).

A significant add-on to the standard client/server communication, as known from, RPC is the consumer triggered client/server communication. Every event received at the consumer side is queued into the consumer's input queue and can be retrieved by calling the getValue( ) method (see description below) without getting any callback( ) routines dispatched. This feature allows the consumer to process a new event when appropriate without taking care of the restrictions that go along with asynchronous dispatching.

Location Transparency

The location of the communication partner (supplier as well as consumer) is fully transparent (i.e. as to whether it is located within the same process, on the same host, or on a remote host).

The ATOMIC communication system decides which protocol provides the best performance for the particular connection.

The user can specify a shared memory flag as an attribute to the constructors of the CsaConnectable (supplier) and CsaRemote (consumer) objects, and it is treated as a hint to the communication system.

ENVIRONMENT AND HOOKS

The Environment String

The ATOMIC communication system (Msc) transfers data together with additional header information containing the sender's peer address, the addressee's peer information, and an optional user specified environment string. The data type of the environment is defined in the header file CsaMscOptions.hh as follows:

const int theCsaMscEnvSize=32;

typedef char CsaMscEnvType[theCsaMscEnvSize];

The environment string can be passed to sender/receiver methods (see CsaConnectable's setValue( )/getValue( ) and CsaRemote's getValue( )/dataChanged( ) descriptions below).

The semantics of the environment string are application specific and defined. The ATOMIC communication system passes the environment data without interpretation.

Adding and Removing Hook Routines

The ATOMIC communication system provides an interface to implement two hook routines, one at the supplier side that is called before the data are sent and one at the consumer side, that is called before the received data are stored in the target object. The hook routines are of type bool (i.e., boolean) and are called with one argument, the environment string. The hook routines are implemented once per process and are intended to be used by applications that modify/ interpret implicitly the environment string (e.g. copy thread specific data into the environment string or store the environment string as thread specific data).

The value ("true" or "false") returned by the hook routines influences the data transfer. In that regard, the value "true" doesn't change the behavior while value "false":

- at the supplier side, aborts a setValue( ) call without sending the data to the consumer(s)
- at the consumer side, aborts a getValue( ) call without copying the data to the consumer(s) target object(s) and without dispatching/notifying the consumer.

These hook routines may be used for event filtering depending on (implicitly or explicitly specified) environment string contents.

The following sample code shows how the hook routines can be inserted, removed or changed. This sample code shows setting supplier and consumer hook routines:

```
//include options header file
#include <CsaMscOptions.hh>
// the input (consumer) hook routine
static bool inHook (CsaMscEnvType & theEnv) {
    return (true);
}
// an alternate input (consumer) hook routine
static book inHook2 (CsaMscEnvType & theEnv) {
    return (true);
}
```

```
// the output (supplier) hook routine
static bool outHook (CsaMscEnvType & theEnv) {
    return (true);
}
CsaMscOptions theHooks={inHook, outHook};
// set the hook routines
CsaOsOptDb: :setOptions(CsaMscOptionName, (void *)&
    theHook);
// read the hook routines
CsaOsptDb: :getOptions(CsaMscOptionName, (void *) &
    theHooks);
// modify and update the consumer hook routine
theHooks.theInputHook=inHook2;
CsaOsOptDb: :setOptions(CsaMscOptionName, (void *) &
    theHooks);
```

Building Classes and Structures

Some goals for the design of a communication are:

the communication should be protocol transparent, the communication should be location transparent, the communication should be able to transfer all generic data types supported by the compiler, the application programmer should not have to deal with data representation details such as XDR routines the communication systems restrictions to the class design should be as few as possible.

To achieve these goals, two macros, discussed below, are provided to the class designer, which macros make the class transferrable by the communication system. These macros are referred to herein as the IMPLEMENT_MSC and DECLARE_MSC macros. The class definition must be identical for both the supplier and the consumer. Therefore, the same header file is included by both communication endpoints; changes of the header file do not cause inconsistencies because they are not done in different files.

The XDR encoding/decoding is performed internally by a communication subsystem (the IMPLEMENT_MSC macro must be present and specify all data members to be transferred), if the corresponding communication endpoint is located on a host with different internal data representation (different processor architecture).

The short component class example below shows how to use these macros in nested classes (structures are handled identically to classes; the DECLARE_MSC macro is inserted in the public (default) section of the structure):

```
const int theFloatDimension = 333;
// user class example 1
class XyzSimpleClass {
    public:
        XyzSiimpleClass () {}
        ~XyzSimpleClass () {}
        DECLARE_MSC(XyzSimpleClass)
    protected:
        int         aIntVar;
        float       aFloatArray[theFloaDimension];
};
IMPLEMENT_MSC(SyzSimpleClass, V(aIntVar) V(aFloatArray))
//user class example 2
class AbcWithPointers {
    public:
        AbcWithPointers(XyzSimpleClass *thePointer = 0):
            myPointer (thePointer)
            {   dsblDataChanged (); }
        ~AbcWithPointers () {}
        bool dataChanged (CsaMscRcvdFrom from_in,
```

-continued

```
                       CsaMscEnvType &theEnv)
        { return (true) ; }
        DECLARE_MSC(AbcWithPointers)
    protected:
        double          myDoubleVar;
        XyzSimpleClass  mySimpleClass;
        XyzSimpleClass  *myPointer;
};
IMPLEMENT_MSC(AbcWithPointers, V(myDoubleVar)
        V(mySimpleClass) P(myPointer)
```

There is no restriction in the number or size of the data members that are to be transferred. Some compilers-preprocessors, however, limit the size of macro expansions.

The DECLARE_MSC Macro

The DECLARE_MSC macro makes the class accessible by a communication endpoint (CsaConnectable=supplier or CsaRemote=consumer) by declaring the inserter/extractor operators of the communication system's internal encoder/decoder class as friends, and implementing a few very short member functions (the enable/disable dataChanged( ) method), and one member function pointer (the dataChanged( ) method itself) into the class.

The DECLARE_MSC macro must be added to the public section of the class as it inserts the member function pointer into the protected section of the class and the member functions into the public section of the class.

The IMPLEMENT_MSC Macro

The IMPLEMENT_MSC macro defines the subset of data members that are to be transferred and tells the underlying system how to deal with pointers/vectors.

The IMPLEMENT_MSC macro must be placed after the class definition (it implements the inserter/extractor operators of the communication system's internal encoder/decoder class.

The IMPLEMET_MSC macro has two arguments—the class name and a list of white space separated macros; one macro for each transferrable data member. The V(datamember) macro tells the communication system to treat the variable in the argument as a scalar or vector that is to be transferred.

The P(datamember) macro tells the communication system to dereference the pointer specified in the argument and transfer the contents of the class/structure/variable the pointer points to.

It should be noted that:
All variable specification macros (e.g., V( ) and P( ) . . . ) build a white space separated list.

The user classes may be derived from other classes. The data members of the base class must be specified in the IMPLEMENT_MSC macro of the derived class.

Classes may be nested (container classes).

The transfer is restricted to data members (no VMT's . . . ).

CsaConnectable (The Supplier)

A CsaConnectable is the supplier class associated with a pattern string in order to transfer component classes (specified as templates) to consumer(s) associated with the same pattern string residing on local or remote hosts.

The class CsaConnectable is a template class and therefore can only exist in conjunction with a concrete component class.

A more detailed interface description is provided below and sample code is provided under the heading "Examples."

The Constructor

The constructor takes two arguments:

a pattern string which specifies the name of the communication endpoint, an attribute mask (local/shared memory has to be used for message buffering)

The CsaConnectable establishes the connection to the underlying basic communication system and allocates a generic SESAM (reference should be made to application Ser. No. 08/675,616, incorporated herein by reference) slot for event notification.

Data Transfer

Data transfer is initialized by a call to member function setValue( ). The user object specified in the argument list contains the data to be transferred.

In most cases, the event propagation mode will be used. In this mode, only one argument must be supplied—a reference to the user class object that contains the data to be transferred.

Both, the PUSH mode and the PULL mode interface do not differ from the suppliers point of view. Reference should be made to FIG. 4 wherein setValue( ) using event propogation or client/server communication without reply is illustrated.

In case of client/server communication, some more information must be passed to setValue( ). Because only one server can be connected to the supplier, one of the existing consumers must be selected as the server. This can be performed by calling getConsumers( ), selecting the appropriate consumer and passing the consumer informations (class CsaMscPeerInfo) as an argument to setValue.

In the client/server mode, a reply from the server (consumer) might be expected. If the reply argument is specified, the call to setValue( ) blocks until the reply is received. Reference should be made to FIG. 5 wherein blocking of setValue( ) using client/server communication with reply is illustrated.

The last data set transferred through the CsaConnectable can be reread via getValue( ). The getValue( ), unlike the getValue( ) method of CsaRemote, never blocks because the requested data are already present (or not; in this case an error status will be returned). Therefore, not asynchrony is provided in the CsaConnectable's getValue( ) interface.

If blocking calls (client/server mode only) to setValue( ) are not acceptable, the setValue( ) method can be performed in a separate thread. This is done by implicitly using the SESAM's dynamic slot mechanism. The synchronization (again, reference should be made to application Ser. No. 08/675,616, for a more detailed description of these aspects of SESAM) can be realized in two different ways—waiting for a SynchHandle (returned by setValue( )) (see FIG. 6 illustrating nonblocking setValue( ) using client/server communication with reply—waitFor . . . ( ) and/or getting a callback method (must be passed to setValue( ) dispatched after completion of setValue( ) (see FIG. 7 illustrating nonblocking setValue( ) using client/server communication with reply—callback.

It should be noted that asynchronous setValue( ) calls are only supported if a reply was requested.

In the constructor of CsaConnectable, a generic SESAM slot is allocated, and the SynchHandle associated with this slot is stored as a CsaConnectable's private data. This SynchHandle—in this context called notification handle—can be obtained by calling the method getNotificationHandle( ). This handle can be used for example in watchdog threads that keep track of replies that are initiated by setValue( ) calls of other threads without knowledge of the setValue( )'s arguments.

Data Processing

The data members of the user class object are copied by an i/o stream-like encoder/decoder into a message buffer, which is passed to the underlying communication system. The CsaConnectable holds always the latest message buffer for subsequent getValue( ) calls and to grant requests from a PULL mode consumer. There is no 1 to 1 relationship between this message buffer in the output queue and a specific user class object, if more than one object has been transferred through this CsaConnectable by one or more threads.

Design Restrictions

CsaConnectables (suppliers) may be located on a stack, allocated from a heap or stored in a global address space. CsaConnectables in shared memory are not supported.

There must not be classes derived from class CsaConnectable. Containment can be used instead.

There are no restrictions on the lifetime of the CsaConnectable.

CsaRemote (Consumer)

CsaRemote is the consumer class associated with a pattern string in order to receive component classes (specified as templates) in PUSH mode or PULL mode from supplier (s) associated with the same pattern string residing on local or remote hosts.

The class CsaRemote is a template class and therefore can only exist in conjunction with a concrete component class.

The Constructor

The constructor takes two arguments: a pattern string which specifies the name of the communication endpoint; and an attribute mask specifying:

a) whether a shared/local memory has to be used for message buffering, b) whether or not an incoming message must be queued, and c) the CsaRemote (consumer) to select the PUSH/PULL mode.

The CsaRemote establishes the connection to the underlying basic communication system and allocates a generic SESAM (see SESAM API description, copending application Ser. No. 08/675,616, slot for event notification.

Data Transfer

For the consumer side there are two modes of operation, the event propagation containing the PUSH and PULL modes as well as the client/server communication (supplier and consumer triggered).

The supplier triggered modes—event propagation PUSH mode and the client/server mode—are very similar from the consumer's point of view; the only difference is the reply that will be returned to the supplier (if requested) in client/server mode. Common to both modes is the dispatching scheme and the blocking/nonblocking getValue( ) (receive) calls.

Consumer triggered mode—event propagation PULL mode—is different from the supplier triggered mode in copying the last data set (that will always be kept by the supplier) by every call to getValue( )—regardless whether the supplier's data changed or didn't change between two calls to getValue( ).

Data Filter Method dataChanged

The DECLARE_MSC macro adds a data filtering and event dispatching mechanism to the user's component class.

The designer of the user component class can add a method (in this document always named dataChanged( ) to his class, that can be enabled or disabled at runtime. This method is—if enabled—implicitly called after copying the received data into the target object—regardless whether the data are received by a synchronous/asynchronous call to getValue( ) or by enabling the dispatching with setCallbackObject( ). In the latter case, the action routine that will get dispatched is the dataChanged( ) member function. There are two arguments passed to the dataChanged( ) method, a mask of type CsaMscRcvdFrom which specifies the location of the sender (same thread, same process but different thread, other process on same host or process on a remote host) (see SESAM API description) and the environment string.

In client/server mode, the return value of dataChanged( ) is returned to the supplier (client) together with the thread specific error object, if a reply was requested.

The great advantage of dispatching a member function of the user class is the accessibility of all data members by the dispatched function.

The dataChanged( ) method is enabled by invoking the user class method:

void enblDataChanged(
  bool (userclass::*f)(CsaMscRcvdFrom, CsaMscEnvType
    &
  )
);

The dataChanged( ) method is disabled by invoking the user class method void dsblDataChanged(void);.

Both methods are implemented by the macro DECLARE_MSC.

It should be noted that the dataChanged( ) method always should explicitly disabled or enabled in the constructor of the user class to avoid uninitialized member function pointer. Toggling between enabled and disabled state is possible at runtime.

Supplier Triggered Event Processing

Figure 8:
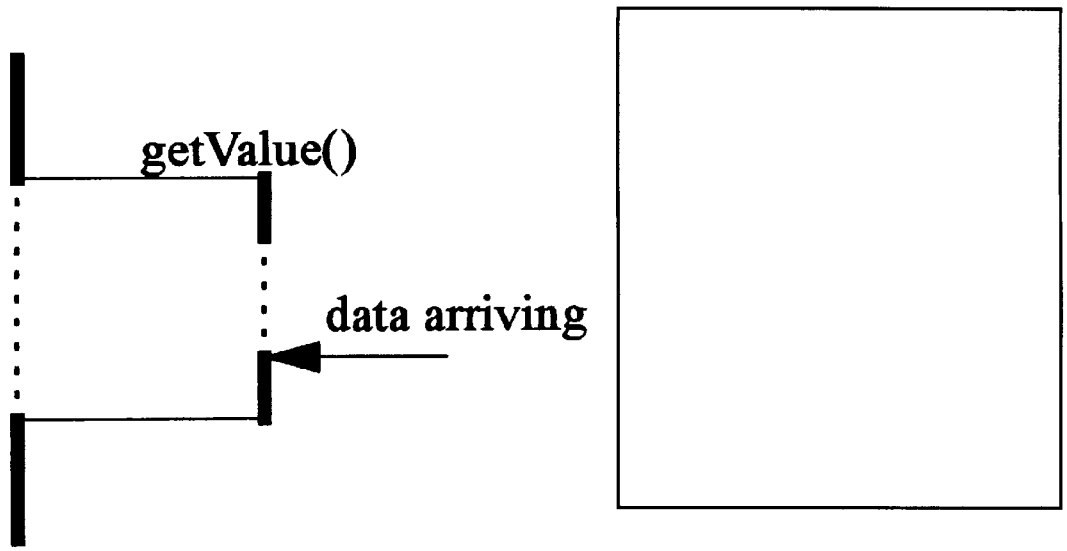
FIG. 8 illustrates blocking getValue( ) without dataChanged( ) enabled.

The most simple case is just calling getValue( ) with one argument, the reference to a user object as the receiver buffer without enabling the dataChanged( ) method. The object getValue( ) blocks until data are available for reading. Reference should be made to FIG. 8 which illustrates blocking getValue without dataChanged enabled.

Figure 9:
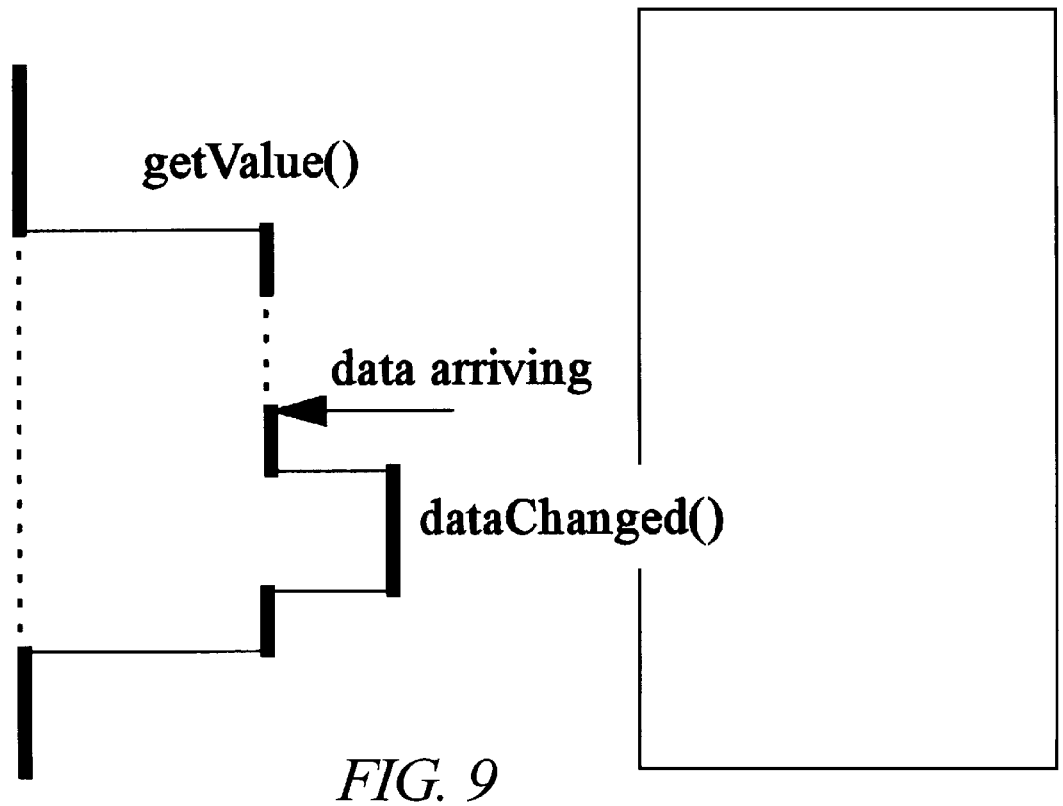
FIG. 9 illustrates sending no reply with dataChanged( ) enabled.

If the dataChanged( ) method is implemented and enabled, it is invoked after reading the incoming data and before returning to the caller of getValue( ). Reference should be made to FIG. 9 which illustrates blocking getValue with dataChanged enabled.

Figure 10:
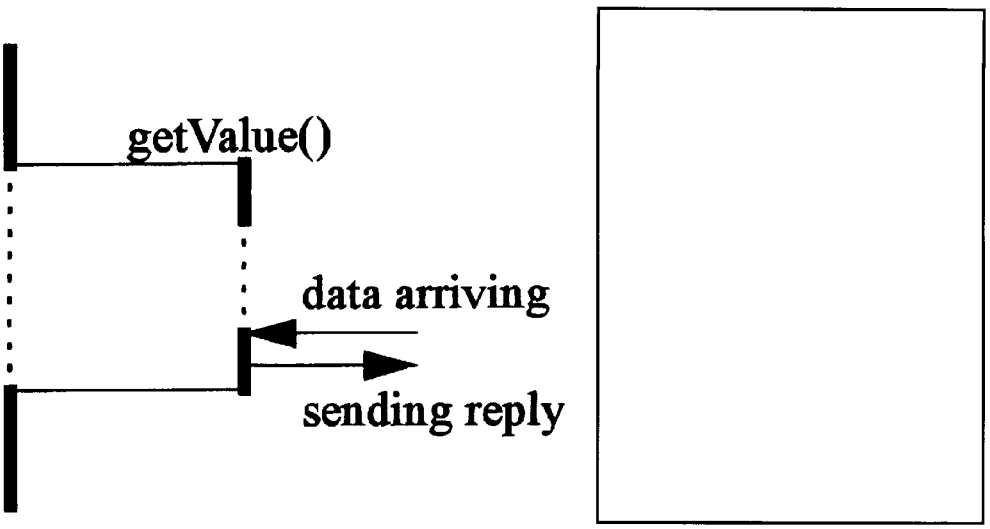
FIG. 10 illustrates sending reply without dataChanged( ) enabled.
Figure 11:
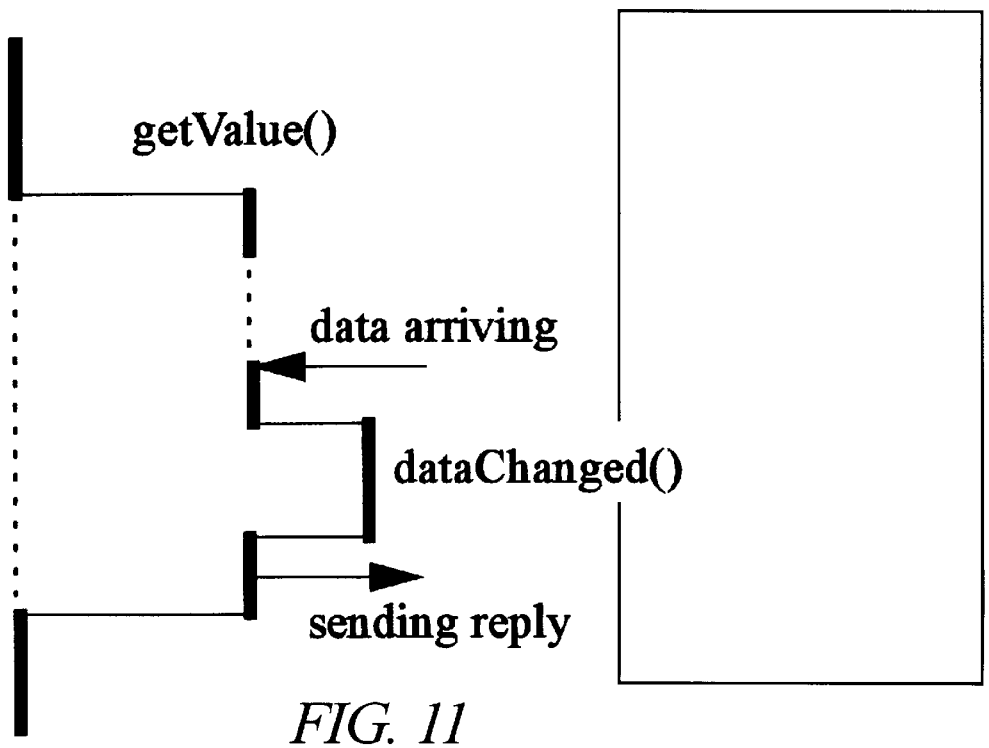
FIG. 11 illustrates sending reply with dataChanged( ) enabled.

In client/server mode, the supplier may request a reply. If no dataChanged( ) method is implemented and enabled, the reply will be delivered with and have the status of "success" after copying the incoming data into the target object. In that regard, reference should be made to FIG. 10 which illustrates sending a reply without dataChanged( ) enabled. If the dataChanged( ) method is implemented and enabled, the reply will be delivered after return from dataChanged( ) passing the return status and, if dataChanged( ) returned 'false', the thread specific error object back to the supplier. In that regard, reference should be made to FIG. 11 which illustrates sending a reply with dataChanged( ) enabled.

As described for CsaConnectable, the blocking invocation can be performed in a separate thread implicitly using SESAM's dynamic slot mechanism. The synchronization (see detailed description in commonly assigned and copending application Ser. No. 08/675,616, can be realized in two different ways—waiting for a SynchHandle (returned by getValue( )) (see FIG. 12 which illustrates nonblocking getValue( ) using waitForMultipleObjects) and/or getting a callback method (must also be passed to setValue( )) dispatched after completion of setValue( ) (see FIG. 13 which illustrates nonblocking getValue( ) using a callback function).

Figure 14:
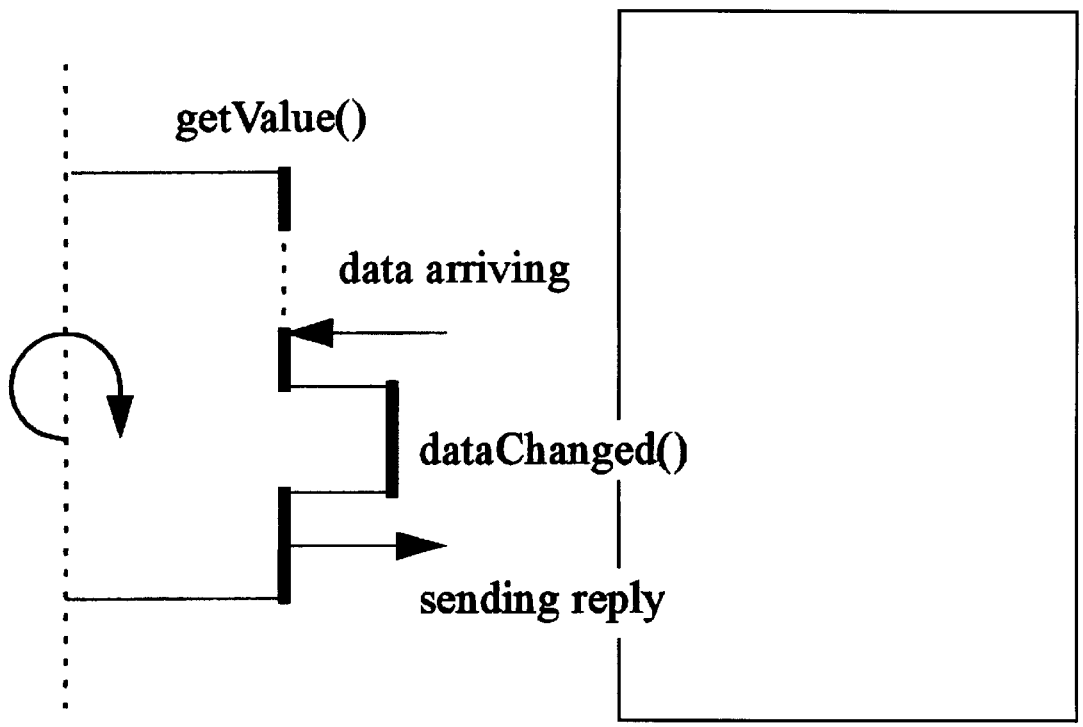
FIG. 14 illustrates dispatching dataChanged( ) to handle incoming data.

Many applications are event driven or have more than one input event to wait for. These applications cannot block in a single getValue( ); they need to get dispatched after arrival of data in one or more CsaRemote objects. This applications can declare an object as the receiver object for the specified CsaRemote object using the dataChanged( ) method as the callback method. The dataChanged( ) method is dispatched from the main dispatcher as long as the input queue contains unread data, similar to the RPC action routine(see FIG. 14 which illustrates dispatching dataChanged( ) to handle incoming data). At invocation time of dataChanged( ) the data are already stored in the specified object. Reply handling is similar as described for getValue( ) calls with dataChanged( ) enabled.

It should be noted that the dataChanged( ) method must be enabled before invoking setCallbackObject( ).

After enabling the dataChanged( ) method as the dispatcher for incoming events, no further getValue( ) calls are possible for this CsaRemote object.

In some cases it may be of interest to be notified every time data on one or more CsaRemote objects arrive. The application process then would call the method waitForMultipleObjects( ) on the notification handle(s) of the CsaRemote object(s) of interest and invoke for every signaled CsaRemote object the getValue( ) method with the flag "NOWAIT", as long as data are available.

Consumer Triggered Event Processing

In event propagation PULL mode, the consumer triggers the receiving of messages from supplier(s). To get only one data set for the pull request, one specific supplier must be selected. The selection is done by calling the method getSuppliers( ), selecting one of the suppliers and calling the method getValue( ) for the selected supplier.

Figure 15:
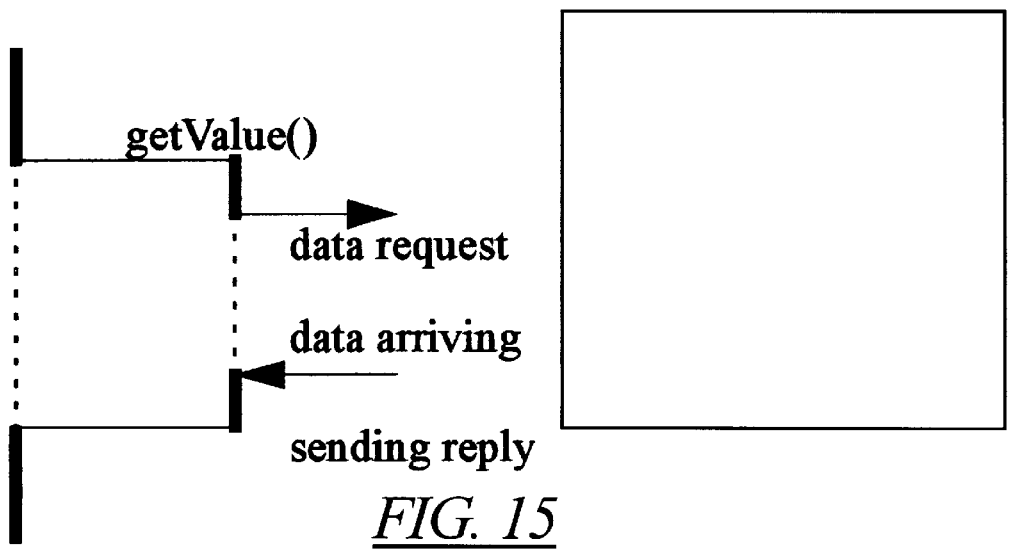
FIG. 15 illustrates blocking a PULL mode getValue( ) using NOWAIT flag.
Figure 16:
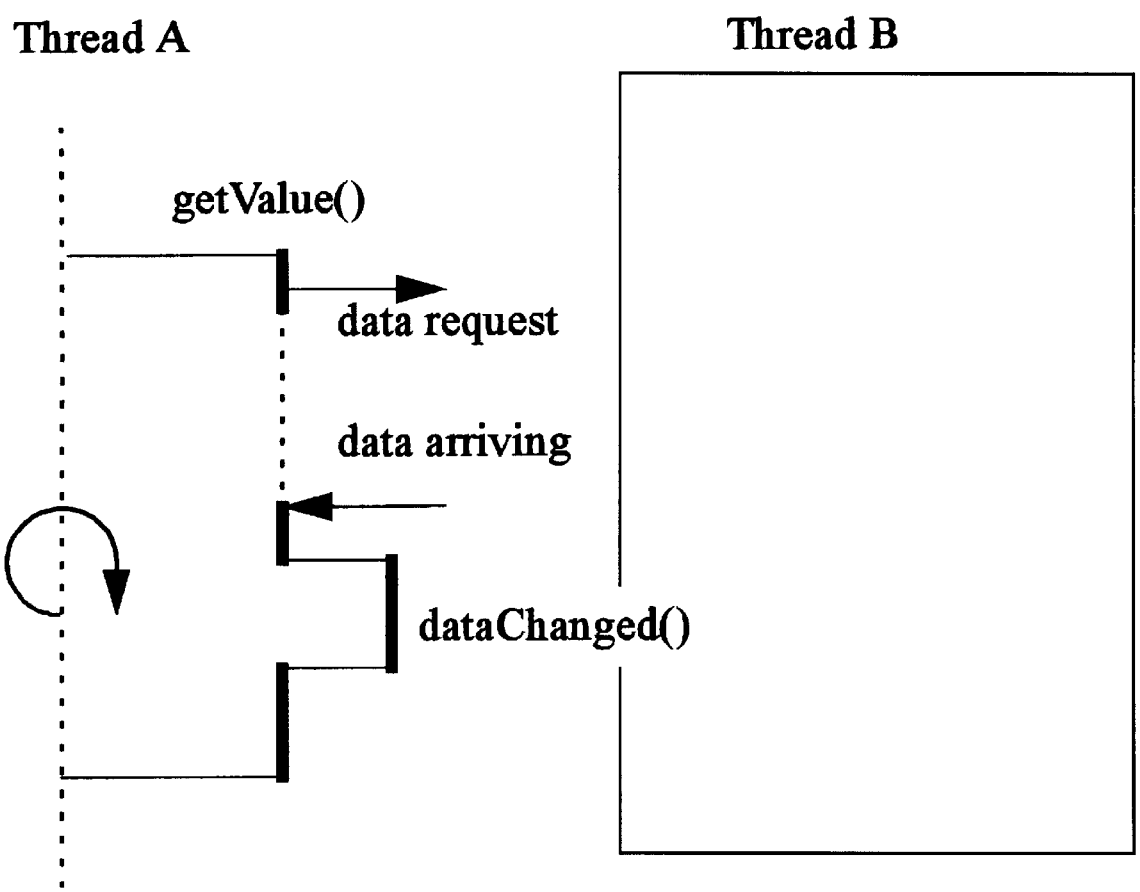
FIG. 16 illustrates dispatching dataChanged( ) to handle pulled data.
Figure 17:
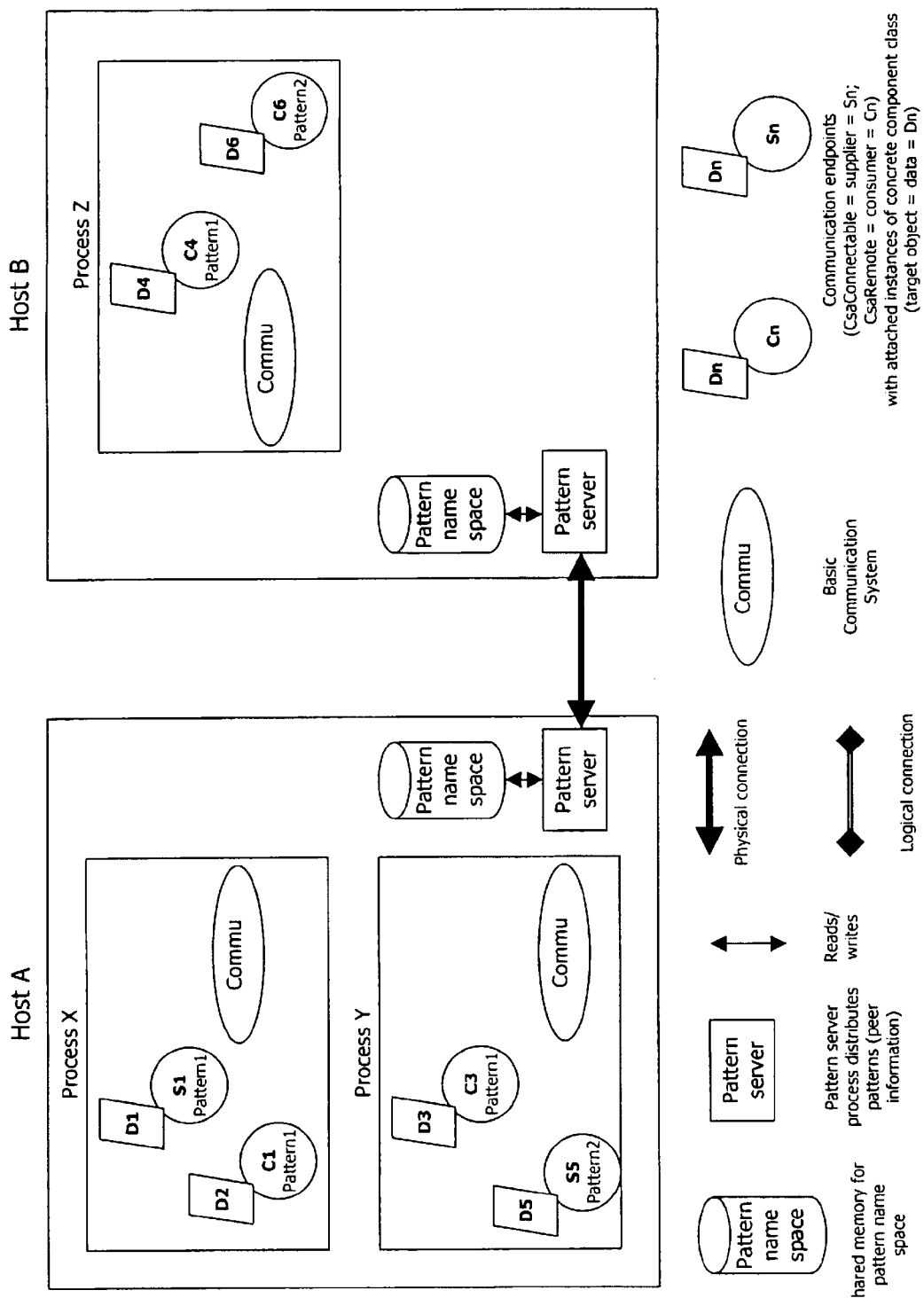
FIG. 17 illustrates means for managing logical connections based on patterns (configuration example).
Figure 18:
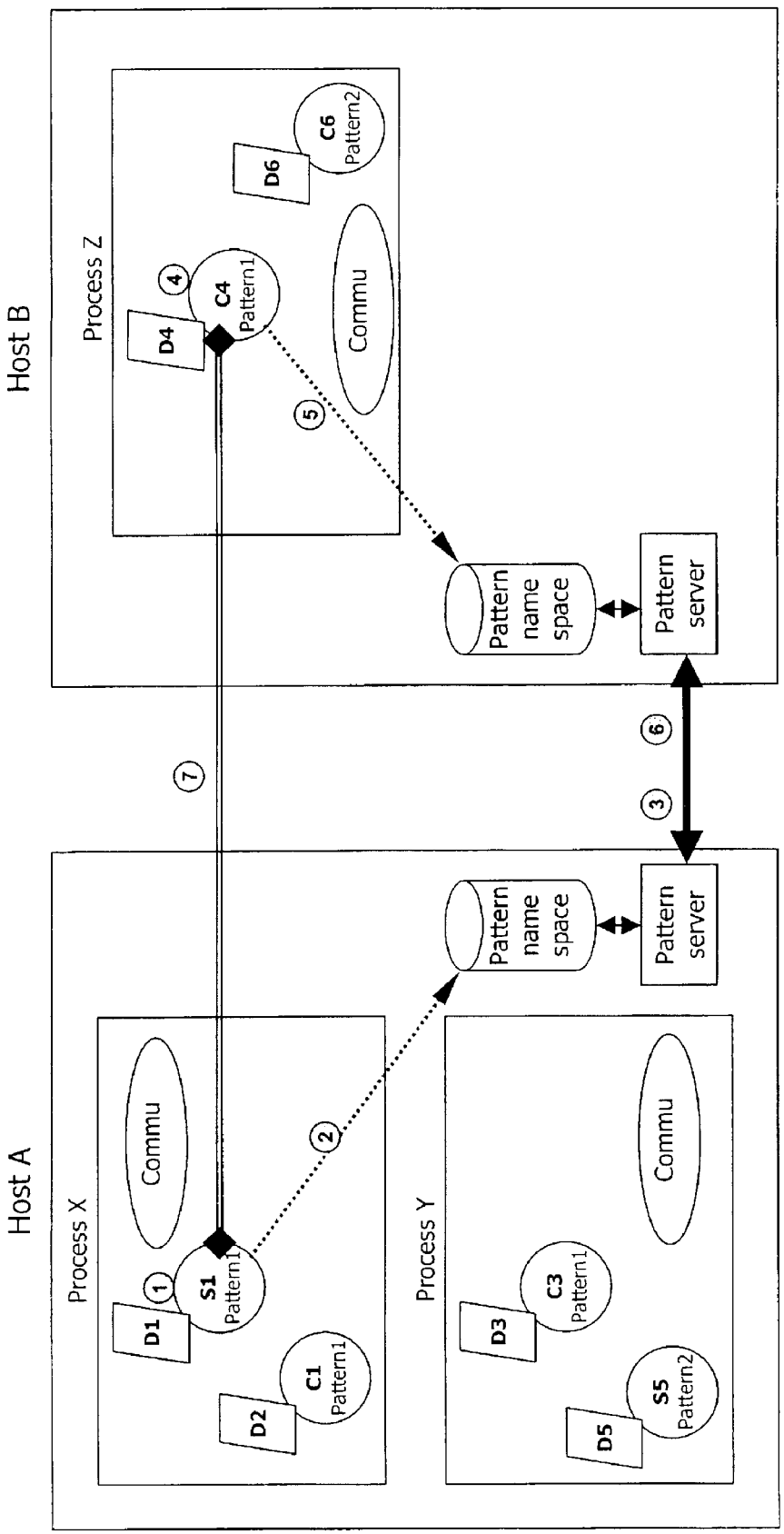
FIG. 18 illustrates means for managing logical connections based on patterns.
Figure 19:
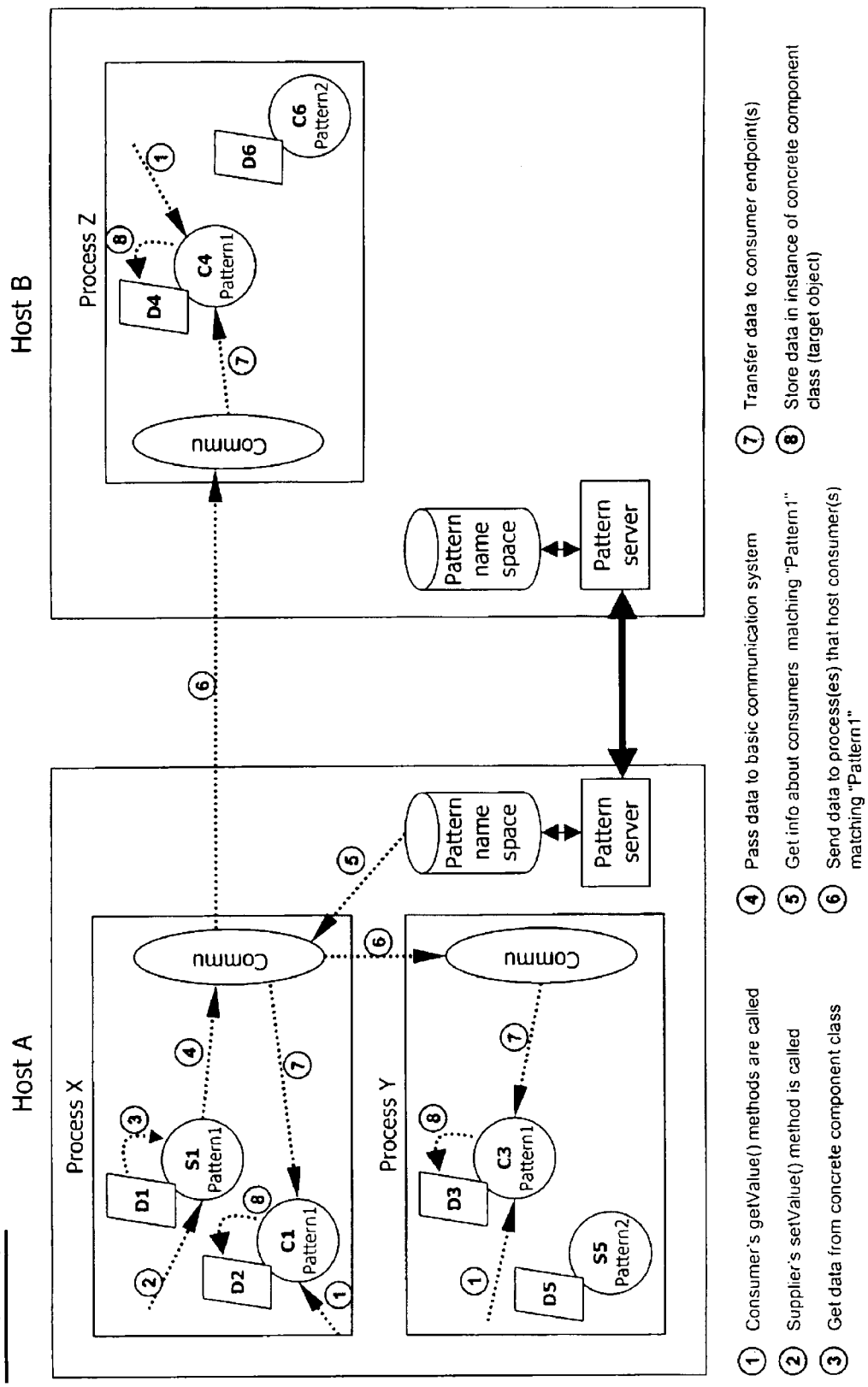
FIG. 19 illustrates means for propagating events in push mode.
Figure 20:
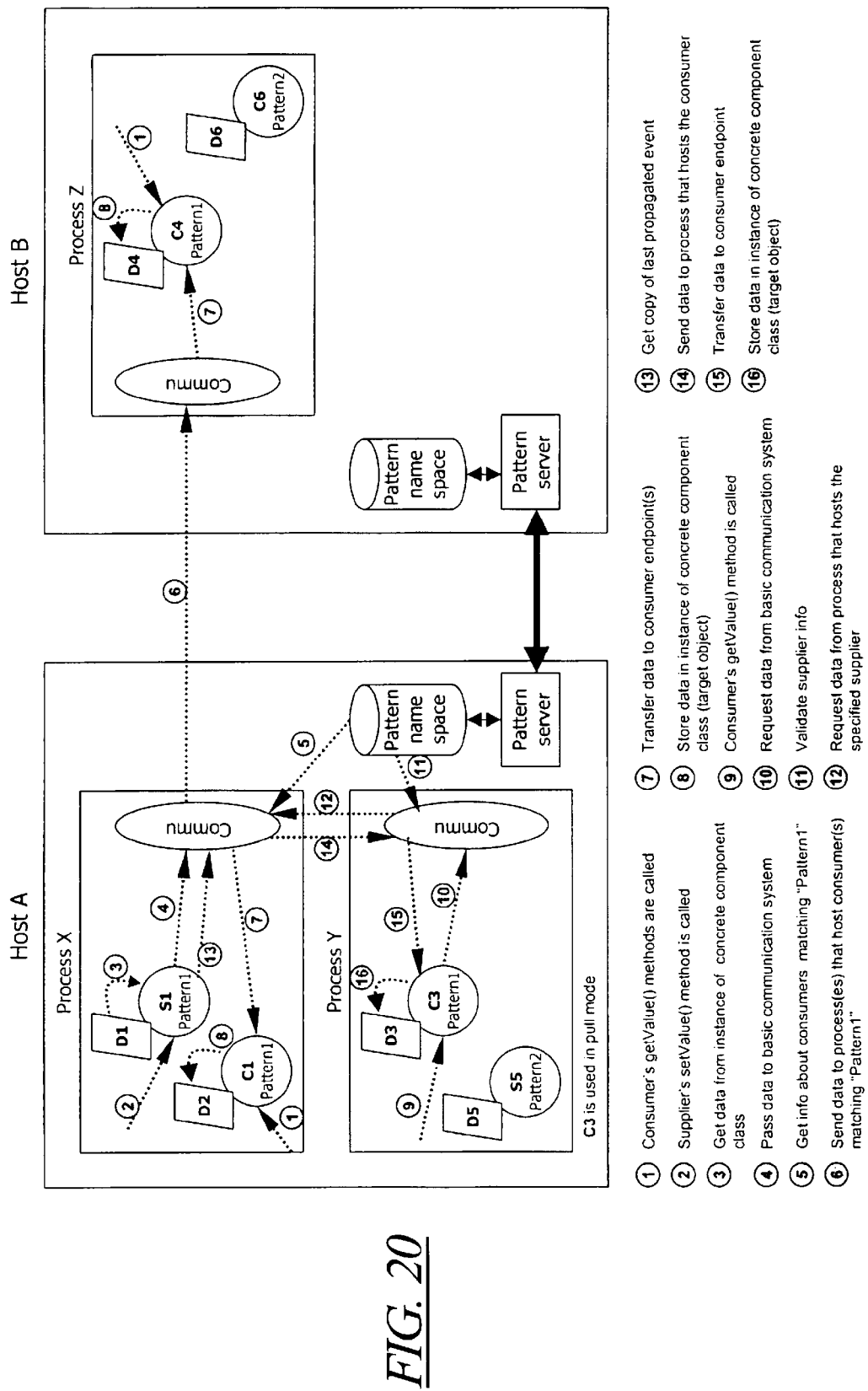
FIG. 20 illustrates means for propagating events in both push and pull modes.
Figure 21:
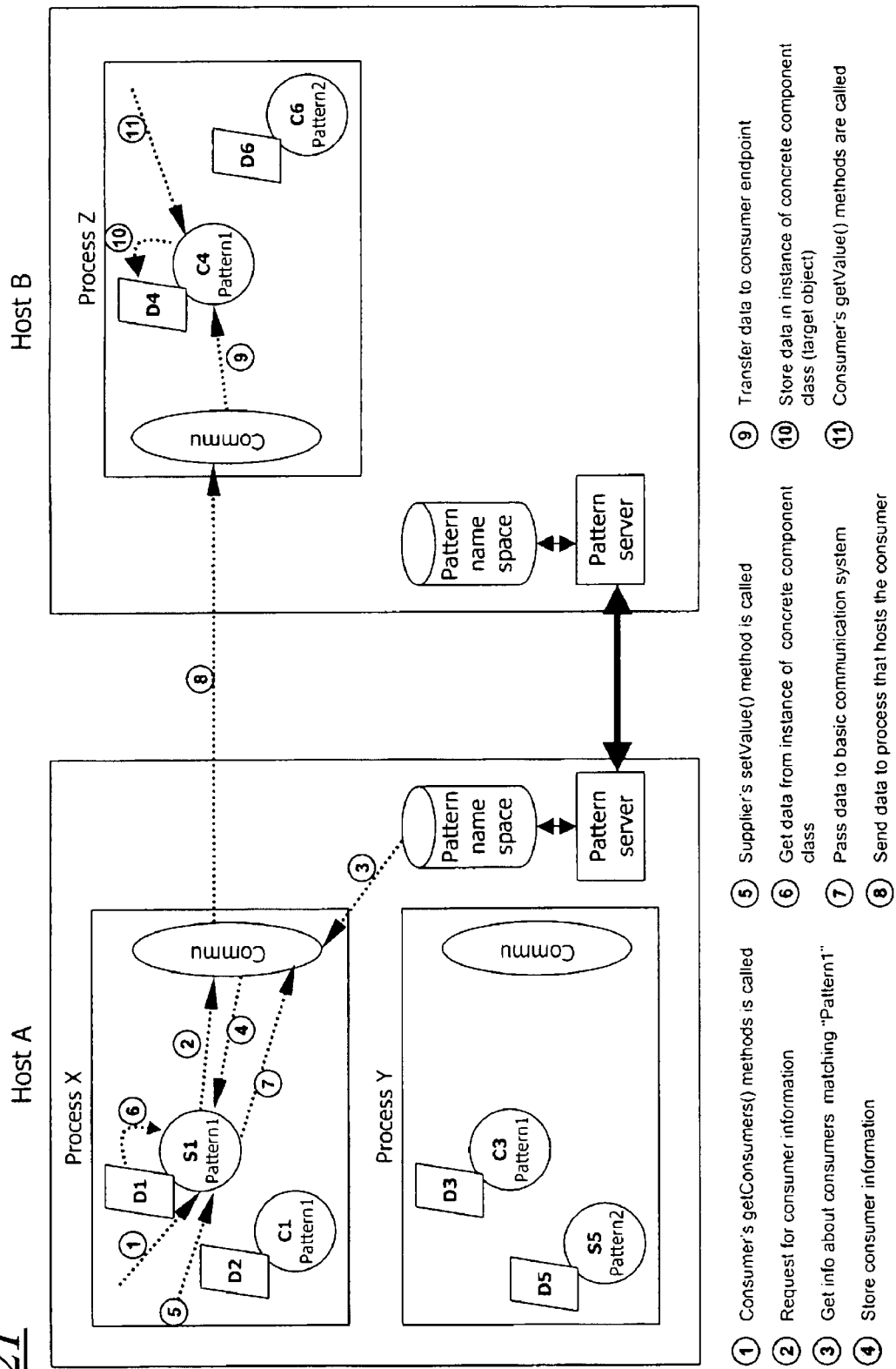
FIG. 21 illustrates means for sending events in client-server mode.
Figure 22:
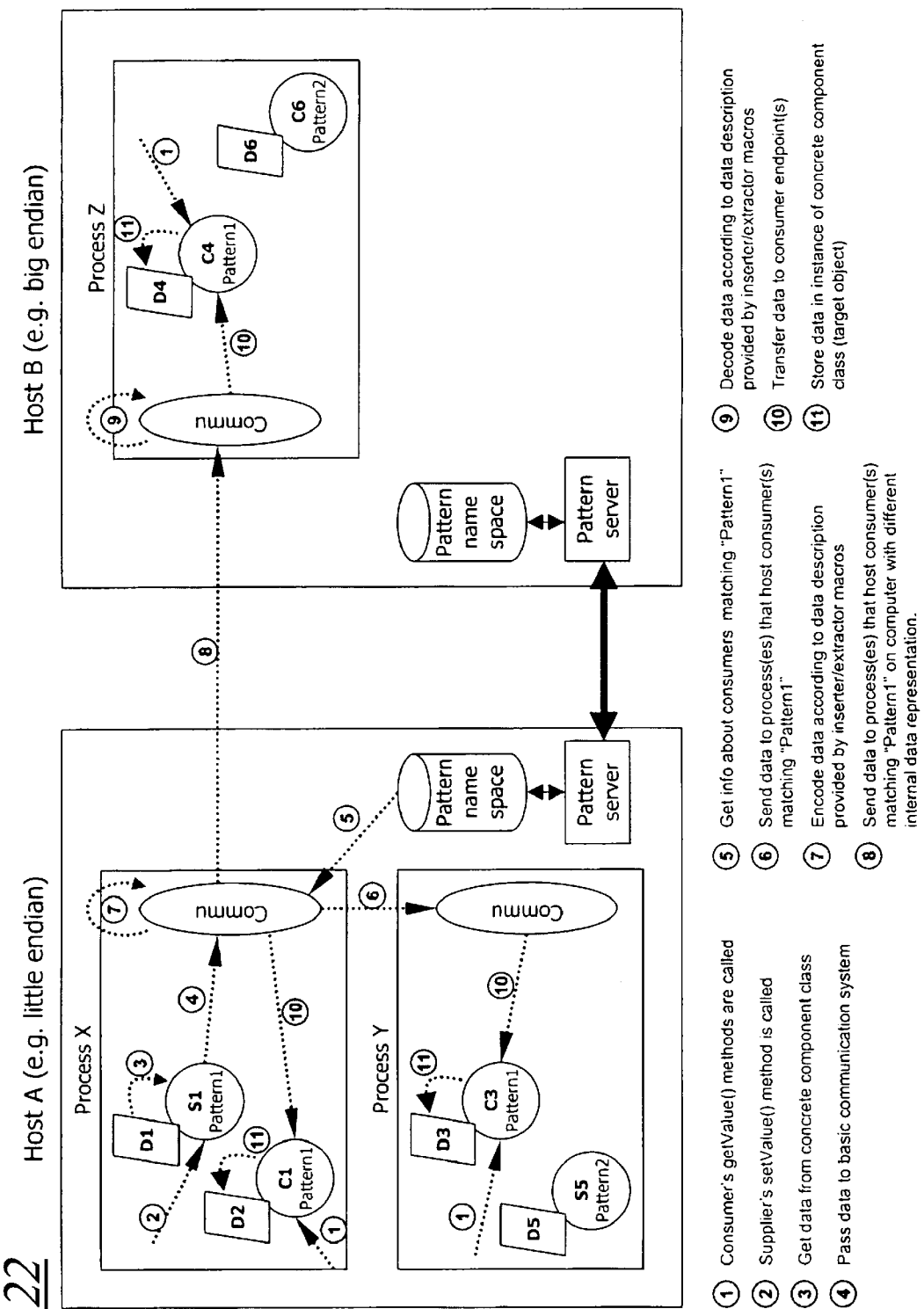
FIG. 22 illustrates means for supporting external data representation without invoking an interface definition language.

The CsaRemote class provides two different ways of pulling data from the consumer—request a data set regardless if it was yet read by a previous call to getValue( ) (by calling getValue( ) with the flag "NOWAIT") or request a new version of the data set (by calling getValue( ) with the flag "WAIT" which means wait for a new update by the supplier)(see FIG. 15 which illustrates blocking PULL mode getValue( ) using the NOWAIT flag).

In the latter case the request for a new update is queued at the supplier's CsaConnectable until the next setValue( ). This setValue( ) causes all queued requests to be granted, regardless if they are queued by one or more CsaRemotes (i.e. if more than one request from one CsaRemote is pending at the same CsaConnectable, the setValue( ) method grants all requests!).

The asynchronous functionality—passing the getValue( ) invocation to SESAM's dynamic slots and waiting for completion and/or forcing a callback function to be dispatched, respectively—is similar to that of the PUSH model.

The dispatching of the dataChanged( ) method enabled by a previous call to setCallbackObject( ) is slightly different by means of initiator of the callback. In PULL mode the datachanged is dispatched due to the supplier's response on a consumer's getValue( ) call (see FIG. 13 which illustrates dispatching dataChanged( ) to handle pulled data).

Replies in Client/Server Mode

As described above, replies are possible in client/server mode only. For the processing of replies, see Table 2 below. In Table 2, the entry of an "X" means "not of concern."

TABLE 2

Reply Behavior

| PULL mode | QUEUED | setCallback-Object() | Reply - Behavior |
|---|---|---|---|
| NO | NO | NO | Implicit reply after the message is stored in the input message queue. The input queue has the length of 1 message. |
| NO | NO | YES[b] | see above |
| NO | YES[c] | NO[1)] | Get_value() calls the dataChanged() method, which returns an error status passed as a reply status to the supplier. Each message can trigger one reply. |
| NO | YES[3)] | YES[2)] | The return status of the dataChanged() method is passed to the supplier of the message as a reply status (implicitly) |
| YES | X | X | No reply possible |

Notes:
[1)]Consumer triggered event event processing.
[2)]Supplier triggered event event processing.
[3)]If the queue is full, the supplier will block until the consumer dequeues at least one event.

Data Processing

All incoming data are queued into the input queue of the consumer. In the case of PUSH mode consumers that specify the attribute "NOTQUEUED" to the constructor, the input queue has a maximum length of 1 message buffer, which will be overwritten by a new incoming event.

The data members of the user class object are copied by an i/o stream-like encoder/decoder from a message buffer, which is queued to the input queue of the CsaRemote, to the user class object.

There is no 1 to 1 relationship between this message buffer in the output queue and a user class object, if more than one object has been transferred through this CsaRemote.

Design Restrictions

CsaRemote objects (consumers) may be located on a stack, allocated from a heap or stored in a global address space. CsaRemotes in shared memory are not supported.

There must be no classes derived from class CsaRemote. Instead, one must use containment.

There are no restrictions on the lifetime of a CsaRemote object.

The user class object's lifetime must not be less than the lifetime of the CsaRemote.

In summary, the principal new approach of the invention is the novel and inventive combination of all the following features within a single homogenous package:

object oriented supports external data representation without the need of an Interface Definition Language Event-Propagation for Push&Pull-Modes Client-Server Communication with reply full asynchronous Support multithreaded and multithreadsafe Layering between Application-View and Implementation-View transparency of locations and protocols and according optimizations use of a server process for pattern-management only in the registration phase, but never in the Transport phase a fully distributed (with local optimizations) event propagation mechanism, so no further event propagation mechanism is necessary throughout a software system.

EXAMPLES

The following examples illustrate typical usages of CsaConnectable (supplier) and CsaRemote (consumer) objects. Both, the supplier and the consumer, use the same header file with class definitions.

The Header File

```
const int theFloatDimension = 333;
// user class example 1
class XyzSimpleClass {
public:
        XyzSimpleClass(){}
        ~XyzSimpleClass() {}
        DECLARE_MSC(XyzSimpleClass)
protected:
        int        aIntVar;
        float      aFloatArray[theFloatDimension];
};
IMPLEMENT_MSC(XyzSimpleClass, V(aIntVar) V(aFloatArray))
//user class example 2
```

-continued

```
class AbcWithpointers {
        public:
AbcWithPointers(XyzSimpleClass *thePointer = 0): myPointer(thePointer)
        { dsblDataChanged(); } ~AbcWithPointers() {}
bool dataChanged(CsaMscRcvdFrom from_in,
                        CsaMscEnvType &theEnv)
{ return(true); } DECLARE_MSC(AbcWithPointers)
        protected:
                double      myDoubleVar;
XyzSimpleClass mySimpleClass; XyzSimpleClass *myPointer;
};
IMPLEMENT_MSC(AbcWithPointers, V(myDoubleVar) V(mySimpleClass)
P(myPointer))
```

The Supplier Program

```
#include <CsaConnectable.hh>      // communication classes
#include <user.hh>                // user class(es)
// Callback function that notifies the completion of a
// blocking call to setValue() with reply
void * callbackFunc(void *){
                        return ((void *) 0);
}
/*
 * The main program
 */
main(int argc, char **argv)
{
XyzSimpleClass sc1;      // a simple user class AbcWithPointers wp1(&sc1); // a
container user class CsaMscPeerInfo peers;   // information about consumers
        bool    status;     // return status for method calls
CsaSesam::SynchHandleType Synch; // SESAM's synchronization
                                 // handle
// Event Propagation (PUSH mode)
CsaConnectable <AbcWithPointers> con1 ("push_mode_conn");
status = con1.setvalue(wp1);
// Event Propagation (PULL mode)
CsaConnectable <AbcWithPointers> con2 ("pull_mode_conn");
status = con2.setValue(wp1);
// Client/Server mode (no reply, synchronous completion) CsaConnectable
<AbcWithPointers> con3 ("clsv_mode_conn"); status = con3.getConsumers(&peers);
for (peers.reset(); peers++ ;) {
 // . . . select appropriate consumer
 break;
}
status = con3.setValue(wp1, &peers);
// Client/Server mode (reply, synchronous completion)
status = con3.setValue(wp1, &peers, CsaMscPeer::Reply);
// Client/Server mode (reply, callback function)
status = con3.setValue(wp1, &peers, CsaMscPeer::Reply,
                                callbackFunc);
// Client/Server mode (reply, wait for completion)
status = con3.setValue(wp1, &peers, CsaMscPeer::Reply,
                                0, &Synch);
// some code . . .
// AFM'S WaitForMultipleObjects(1,&Synch,LOG_AND,60000);
return 0;
}
```

The Consumer Program

```
#include <CsaRemote.hh>      // communication classes #include <user.hh>
   // user class(es)
// A allback function that notifies the asynchronous completion
// of a call to getValue().
void * callbackFunc(void *){
 return ((void *) 0);
}
/*
 * The main program
 */
main(int argc, char **argv)
{
CsaMscPeerInfo peers;   // information about consumers CsaSesam::SynchHandleType
Synch; // SESAM's synchronization
                                // handle
bool        status; // return status of method calls
/*
 * Event Propagation (PULL mode)
 */
CsaRemote <AbcWithPointers> rem1 ("pull_mode_conn", CsaMscPeer::PullMode);
```

-continued

```
XyzSimpleClass  sc1;    // a simple user class AbcWithPointers wp1(&sc1); // a
container class
// first select a supplier
status = rem1.getSuppliers(&peers);
for (peers.reset(); peers++ ;) {
  // . . . select appropriate supplier
  break;
}
// enable the dataChanged method
wp1.enblDataChanged(AbcWithPointers::dataChanged);
// get data using synchronous getValue() call
while (1) {
  status = rem1.getValue(wp1, &peers);
  // . . . do something
}
// get data using asynchronous getValue() call
status = rem1.getValue(wp1, &peers, CsaMscPeer::Wait, callbackFunc);
while (1) {
status = rem1.getValue(wp1, &peers, CsaMscPeer::Wait,
                                    0, &Synch);
    // . . . do something
    // SESAM'S WaitForMultipleObjects(1,&Synch,LOG_AND,60000);
}
/*
    * Event propagation - PUSH mode 1
    */
CsaRemote <AbcWithPointers> rem2("pull_mode_conn", CsaMscPeer::PushMode);
XyzSimpleClass sc2;    // a simple user class AbcWithPointers wp2(&sc2); // a
container user class
// Enable the dataChanged method
wp2.enblDataChanged(AbcWithPointers::dataChanged);
// First get some data using synchronous getValue() call
status = rem2.getValue(wp2);
// Now let dataChanged method be dispatched on every
// incoming event. From now on every getValue() call
// on this Remote will be rejected.
status = rem2.setCallbackObject(wp2);
// call an appropriate main loop
*/
    * Client/server communication
    */
CsaRemote <AbcWithPointers> rem3("clsv_mode_conn",
                                    CsaMscPeer::PushMode);
XyzSimpleClass sc3;    // a simple user class
AbcWithPointers wp3(&sc3); // a container user class
// Enable the dataChanged method
wp3.enblDataChanged(AbcWithPointers::dataChanged);
// First get some data using synchronous getValue() call
status = rem3.getValue(wp3);
// Now let dataChanged method be dispatched on every
// incoming event. From now on every getValue() call
// on this Remote will be rejected.
status = rem3.setCallbackObject(wp3);
// call an appropriate main loop
}
```

Although modifications and changes may be suggested by those skilled in the art, it is the intention of the inventors to embody within the patent warranted hereon all changes and modifications as reasonably and properly come within the scope of their contribution to the art.

What is claimed is:

1. An object oriented communication system on a computer platform, comprising, within a single homogenous computer program package:

means for supporting full asynchronous, multithreaded and multithread safe external data representation without invoking an interface definition language, said means for supporting external data representation without invoking an interface definition language comprising computer code which implicitly encodes and decodes transferred data;

means for propagating events in both push and pull communication modes with uniform functions and enabling an application programmer to select which mode is used for a given logical connection within a single application program interface and even during said connection;

means for distributing events; and means for managing logical connections based on patterns, wherein data is transferred from peer to peer without an intermediary.

2. The object oriented communication system of claim 1, wherein the means for supporting external data representation without an interface definition language comprises means for implicitly coding and decoding transferred data.

3. The object oriented communication system of claim 1 or 2, wherein all communication end points that use the same address are logically connected.

4. The object oriented communication system of claim 1, wherein there is provided a hook routine which is called at the supplier side before data is sent and a hook routine which is called before data is stored in a target object, both hook routines being called with an environment string as an argument, both hook routines influencing data transfer.

5. The object oriented computing system programmer interface of claim 1, further comprising means for performing XDR encoding and decoding.

6. The object oriented communication system of claim 1, further comprising a macro routine which makes a class accessible to a communication endpoint.

7. The object oriented communication system of claim 6, wherein the macro routine makes the class accessible via the communication end point by declaring inserter and extractor operators of the communication systems internal encoder/decoder class as friends, and implementing short member functions and one member function pointer into the class.

8. The object oriented communication system of claim 1, further comprising a macro routine which defines a subset of data members that are to be transferred and informs the underlying system as to how to handle pointers and vectors.

9. The object oriented communication system of claim 8, wherein the macro routine has two arguments, a class name and a list of white space separated macro routines, one such macro routine for each transferrable data member.

10. The object oriented communication system of claim 1, comprising a supplier class associated with a pattern string in order to transfer component classes to consumers associated with the same pattern string residing on a host.

11. The object oriented communication system of claim 10, wherein the supplier class is a template class and can only exist in conjunction with a concrete component class.

12. The object oriented communication system of claim 1, further comprising a consumer class associated with a pattern string in order to receive component classes in PUSH mode or PULL mode from suppliers associated with the same pattern string residing on hosts.

13. The object oriented communication system of claim 12, wherein the consumer class is a template class and can only exist in conjunction with a concrete component class.

14. An object oriented communication system on a computer platform comprising, within a single homogenous computer program package:
    means for supporting full asynchronous, multithreaded, and multithread safe external data representation without any interface definition language, said means for supporting external data representation without invoking an interface definition language comprising computer code which implicitly encodes and decodes transfer data;
    means for propagating events in both push and pull communication modes with like arguments and enabling an application programmer to select which mode is used for a given logical connection within a single application program interface and even during said connection, including a hook routine called at the supplier side before data is sent and a hook routine called before data is stored in a target object, both hook routines being called with an environment string as an argument;
    means for distributing events; and
    means for managing logical connections based on patterns,
    wherein all communication endpoints that use the same pattern are logically connected,
    wherein only a single application programmer interface is required for a programmer to interface with the system.

15. An object oriented communication system programmer interface on a computer platform, comprising:
    a first macro routine which makes a class accessible to a communication endpoint by declaring inserter and extractor operators of a communication system's internal encoder/decoder class as friends and implementing short member functions and one member function pointer into the class; and
    a second macro routine which defines a subset of data members that are to be transferred and informs the underlying system as to how to handle pointers and vectors, said second macro routine having two arguments, a class name and a list of white space separated macro routines, one such white space separated macro routine for each transferrable data member.

16. The object oriented communication system programmer interface of claim 15, comprising a supplier class associated with a pattern string in order to transfer component classes to consumers associated with the same pattern string residing on a host.

17. The object oriented communication system programmer interface of claim 15, wherein the supplier class is a template class and can only exist in conjunction with a concrete component class.

18. The object oriented communication system programmer interface of claim 15, further comprising a consumer class associated with a pattern string in order to receive component classes in PUSH mode or PULL mode from suppliers associated with the same pattern string residing on hosts.

19. The object oriented communication system programmer interface of claim 15, wherein the consumer class is a template class and can only exist in conjunction with a concrete component class.

20. A storage medium including object oriented code for an object oriented communication system on a computer platform, comprising within a single homogenous computer program package:
    means for supporting full asynchronous, multithreaded, and multithread safe external data representation without invoking an interface definition language, said means for supporting external data representation without invoking an interface definition language comprising computer codes which implicitly encodes and decodes transferred data;
    means for propagating events in both push and pull communication modes and enabling an application programmer to select which mode is used for a given logical connection within a single application program interface and even during said connection;
    means for distributing events; and
    means for managing logical connections based on patterns,
    wherein only a single application programmer interface is required for a programmer to interface with the system.

21. The storage medium of claim 20, wherein the means for supporting external data representation without an interface definition language comprises means for implicitly coding and decoding transferred data.

22. The storage medium of claim 20 or 21, wherein all communication end points that use the same address are logically connected.

23. The storage medium of claim 20, wherein there is provided a hook routine which is called at the supplier side before data is sent and a hook routine which is called before data is stored in a target object, both hook routines being called with an environment string as an argument, both hook routines influencing data transfer.

24. The storage medium of claim 20, further comprising means for performing XDR encoding and decoding.

25. The storage medium of claim 20, further comprising a macro routine which makes a class accessible to a communication endpoint.

26. The storage medium of claim 25, wherein the macro routine makes the class accessible via the communication end point by declaring inserter and extractor operators of the communication systems internal encoder/decoder class as friends, and implementing short member functions and one member function pointer into the class.

27. The storage medium of claim 20, further comprising a macro routine which defines a subset of data members that are to be transferred and informs the underlying system as to how to deal with pointers and vectors.

28. The storage medium of claim 27, wherein the macro routine has two arguments, a class name and a list of white space separated macro routines, one such macro routine for each transferrable data member.

29. The storage medium of claim 20, comprising a supplier class associated with a pattern string in order to transfer component classes to consumers associated with the same pattern string residing on a host.

30. The storage medium of claim 29, wherein the supplier class is a template class and can only exist in conjunction with a concrete component class.

31. The storage medium of claim 20, further comprising a consumer class associated with a pattern string in order to receive component classes in PUSH mode or PULL mode from suppliers associated with the same pattern string residing on hosts.

32. The storage medium of claim 31, wherein the consumer class is a template class and can only exist in conjunction with a concrete component class.

33. A storage medium including object oriented code for an object oriented communication system on a computer platform, comprising within a single homogenous computer program package;

means for supporting full asynchronous, multithreaded, and multithread safe external data representation without invoking any interface definition language, said means for supporting external data representation without an interface definition language comprising computer code which implicitly encodes and decodes transfer data;

means for propagating events in both push and pull communication modes and enabling an application programmer to select which mode is used for a given logical connection within a single application program interface and even during said connection, including a hook routine called at the supplier side before data is sent and a hook routine called before data is stored in a target object, both hook routines called with an environment string as an argument;

means for distributing events; and means for managing logical connections based on patterns, wherein all communication endpoints that use the same address are logically connected, wherein only a single application programmer interface is required for a programmer to interface with the system.

34. A storage medium including object oriented code for an object oriented communication system on a computer platform, comprising:

a first macro routine which makes a class accessible to a communication endpoint by declaring inserter and extractor operators of a communication system's internal encoder/decoder class as friends and implementing short member functions and one member function pointer into the class; and a second macro routine which defines a subset of data members that are to be transferred and informs the underlying system as to how to handle pointers and vectors, said second macro routine having two arguments, a class name and a list of white space separated macro routines, one such white space separated macro routine for each transferrable data member.

35. The object oriented communication system programmer interface of claim 34, comprising a supplier class associated with a pattern string in order to transfer component classes to consumers associated with the same pattern string residing on a host.

36. The storage medium of claim 35, wherein the supplier class is a template class and can only exist in conjunction with a concrete component class.

37. The storage medium of claim 35, further comprising a consumer class associated with a pattern string in order to receive component classes in PUSH mode or PULL mode from suppliers associated with the same pattern string residing on hosts.

38. The storage medium of claim 37, wherein the consumer class is a template class and can only exist in conjunction with a concrete component class.

* * * * *